United States Patent
Kato et al.

(10) Patent No.: US 10,921,783 B2
(45) Date of Patent: Feb. 16, 2021

(54) NUMERICAL CONTROL DEVICE

(71) Applicant: Mitsubishi Electric Corporation, Tokyo (JP)

(72) Inventors: Kenji Kato, Tokyo (JP); Masakazu Sagasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/770,952

(22) PCT Filed: Dec. 18, 2017

(86) PCT No.: PCT/JP2017/045370
§ 371 (c)(1),
(2) Date: Jun. 9, 2020

(87) PCT Pub. No.: WO2019/123521
PCT Pub. Date: Jun. 27, 2019

(65) Prior Publication Data
US 2020/0379438 A1 Dec. 3, 2020

(51) Int. Cl.
*G05B 19/414* (2006.01)

(52) U.S. Cl.
CPC .. *G05B 19/414* (2013.01); *G05B 2219/34015* (2013.01)

(58) Field of Classification Search
CPC .................................................. G05B 19/414
USPC ................................................. 700/20, 11, 1
See application file for complete search history.

(56) References Cited

U.S. PATENT DOCUMENTS

| | | | |
|---|---|---|---|
| 5,670,856 A | * | 9/1997 | Le ................... G05D 1/0077 244/194 |
| 5,726,895 A | | 3/1998 | Kumakura et al. |
| 2002/0049512 A1 | | 4/2002 | Mizuno et al. |
| 2010/0185316 A1 | | 7/2010 | Yamada |
| 2015/0346714 A1 | | 12/2015 | Takahashi et al. |

FOREIGN PATENT DOCUMENTS

| | | |
|---|---|---|
| JP | 63-062002 A | 3/1988 |
| JP | 03-17708 A | 1/1991 |
| JP | 06-314110 A | 11/1994 |
| JP | 09-305212 A | 11/1997 |
| JP | 10-11120 A | 1/1998 |
| JP | 2001-117607 A | 4/2001 |

(Continued)

OTHER PUBLICATIONS

International Search Report and Written Opinion dated Feb. 20, 2018 for PCT/JP2017/045370 filed on Dec. 18, 2017, 9 pages including English Translation of the International Search Report.

(Continued)

*Primary Examiner* — David Luo
(74) *Attorney, Agent, or Firm* — Xsensus LLP

(57) ABSTRACT

A numerical control device includes a first control unit to write a control right request for a second system axis to a shared area in a case where a machining program contains an axis exchange command designating a second system axis that is driven by a second control unit, and determines acquisition of a control right for the second system axis based on a response from the second control unit written to the shared area.

20 Claims, 22 Drawing Sheets

(56) References Cited

FOREIGN PATENT DOCUMENTS

| | | | |
|---|---|---|---|
| JP | 2003-280709 A | 10/2003 |
| JP | 4840506 B2 | 12/2011 |
| WO | 2014/118918 A1 | 8/2014 |
| WO | 2016/157395 A1 | 10/2016 |
| WO | 2017/195259 A1 | 11/2017 |

OTHER PUBLICATIONS

Notification of Reasons for Refusal received for Japanese Patent Application No. 2018-532798, dated Sep. 11, 2018, 8 pages including English Translation.
Notification of Reasons for Refusal received for Japanese Patent Application No. 2018-532798, dated Nov. 27, 2018, 6 pages including English Translation.
Notification of Decision to Grant a Patent received for Japanese Patent Application No. 2018-532798, dated Feb. 12, 2019, 5 pages including English Translation.

* cited by examiner

FIG.3

| | SYSTEM | | FIRST AXIS | SECOND AXIS | THIRD AXIS |
|---|---|---|---|---|---|
| CONTROL UNIT #1 | WHOLE MACHINE | IN CONTROL UNIT | | | |
| | FIRST SYSTEM | (FIRST SYSTEM) | X1 | - | C1 |
| | SECOND SYSTEM | (SECOND SYSTEM) | X2 | Z2 | C2 |
| CONTROL UNIT #2 | SYSTEM | | FIRST AXIS | SECOND AXIS | THIRD AXIS |
| | WHOLE MACHINE | IN CONTROL UNIT | | | |
| | THIRD SYSTEM | (FIRST SYSTEM) | X3 | Z3 | C3 |
| | FOURTH SYSTEM | (SECOND SYSTEM) | X4 | Z4 | C4 |
| CONTROL UNIT #3 | SYSTEM | | FIRST AXIS | SECOND AXIS | THIRD AXIS |
| | WHOLE MACHINE | IN CONTROL UNIT | | | |
| | FIFTH SYSTEM | (FIRST SYSTEM) | X5 | Z5 | C5 |
| | SIXTH SYSTEM | (SECOND SYSTEM) | X6 | Z6 | C6 |

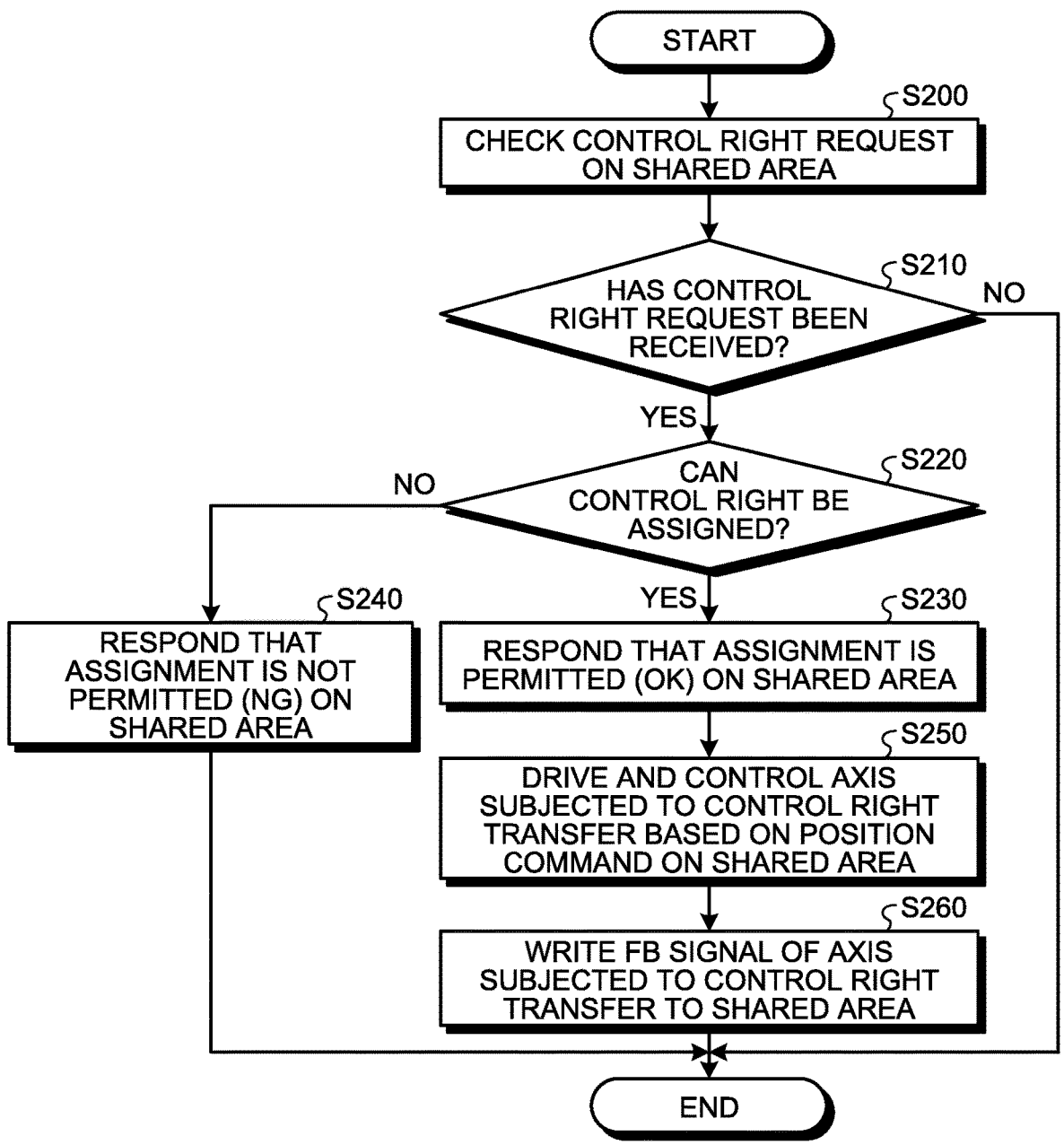

FIG.9

| | 125 | | | | | 225 | | | | | 325 | | |
|---|---|---|---|---|---|---|---|---|---|---|---|---|---|
| | PI | FB | Cmd | Ans | | PI | FB | Cmd | Ans | | PI | FB | Cmd | Ans |
| FIRST SYSTEM THIRD AXIS C1 | | | #1 | OK | | | | | | | | | | |
| SECOND SYSTEM THIRD AXIS C2 | | | #1 | OK | | | | | | | | | | |
| THIRD SYSTEM THIRD AXIS C3 | | | | | | | | | | | | | | |
| FOURTH SYSTEM THIRD AXIS C4 | | | | | | | | | | | | | | |
| FIFTH SYSTEM THIRD AXIS C5 | | | | | | | | | | | | | | |
| SIXTH SYSTEM THIRD AXIS C6 | | | | | | | | | | | | | | |
| FIRST SYSTEM THIRD AXIS C1 | | | | | | | | | | | | | | |
| SECOND SYSTEM THIRD AXIS C2 | | | | | | | | #2 | OK | | | | | |
| THIRD SYSTEM THIRD AXIS C3 | | | | | | | | #2 | OK | | | | | |
| FOURTH SYSTEM THIRD AXIS C4 | | | | | | | | | | | | | | |
| FIFTH SYSTEM THIRD AXIS C5 | | | | | | | | | | | | | | |
| SIXTH SYSTEM THIRD AXIS C6 | | | | | | | | | | | | | | |
| FIRST SYSTEM THIRD AXIS C1 | | | | | | | | | | | | | | |
| SECOND SYSTEM THIRD AXIS C2 | | | | | | | | | | | | | | |
| THIRD SYSTEM THIRD AXIS C3 | | | | | | | | | | | | | | |
| FOURTH SYSTEM THIRD AXIS C4 | | | | | | | | | | | | | | |
| FIFTH SYSTEM THIRD AXIS C5 | | | | | | | | | | | | | #3 | OK |
| SIXTH SYSTEM THIRD AXIS C6 | | | | | | | | | | | | | #3 | OK |

STATE IN N10

FIG.14

| M CODE | AXIS CONFIGURATION | | | CONTROL UNIT NUMBER | SYSTEM NUMBER |
|---|---|---|---|---|---|
| | FIRST AXIS | SECOND AXIS | THIRD AXIS | | |
| M111 | X1 | - | C1 | #1 | $1 |
| M121 | X2 | Z2 | C2 | #1 | $2 |
| M211 | X3 | Z3 | C3 | #2 | $1 |
| M221 | X4 | Z4 | C4 | #2 | $2 |
| M311 | X5 | Z5 | C5 | #3 | $1 |
| M321 | X6 | Z6 | C6 | #3 | $2 |
| M112 | X1 | - | C2 | #1 | $1 |
| M122 | X2 | Z2 | C3 | #1 | $2 |
| M212 | X3 | Z3 | C4 | #2 | $1 |
| M222 | X4 | Z4 | C5 | #2 | $2 |
| M312 | X5 | Z5 | C6 | #3 | $1 |
| M322 | X6 | Z6 | C1 | #3 | $2 |
| M113 | X1 | - | C3 | #1 | $1 |
| M123 | X2 | Z2 | C4 | #1 | $2 |
| M213 | X3 | Z3 | C5 | #2 | $1 |
| M223 | X4 | Z4 | C6 | #2 | $2 |
| M313 | X5 | Z5 | C1 | #3 | $1 |
| M323 | X6 | Z6 | C2 | #3 | $2 |
| ⋮ | | | | ⋮ | ⋮ |

FIG.16

| | STEP | SYSTEM WHOLE MACHINE | IN CONTROL UNIT | FIRST AXIS | SECOND AXIS | THIRD AXIS | | |
|---|---|---|---|---|---|---|---|---|
| CONTROL UNIT #1 | STEP 1 | FIRST SYSTEM | (FIRST SYSTEM) | X1 | - | C1 | | |
| | STEP 2 | SECOND SYSTEM | (SECOND SYSTEM) | X2 | Z2 | C2 | | |
| | STEP 3 | THIRD SYSTEM | (THIRD SYSTEM) | X3 | - | C3 | | |
| | STEP 4 | FOURTH SYSTEM | (FOURTH SYSTEM) | X4 | Z4 | C4 | | |
| | STEP 5 | FIFTH SYSTEM | (FIFTH SYSTEM) | X5 | Z5 | C5 | | |
| | TURNING STEP | 16TH SYSTEM | (SIXTH SYSTEM) | X16 | Z16 | - | | |

| | STEP | SYSTEM WHOLE MACHINE | IN CONTROL UNIT | FIRST AXIS | SECOND AXIS | THIRD AXIS | FOURTH AXIS | FIFTH AXIS |
|---|---|---|---|---|---|---|---|---|
| CONTROL UNIT #2 | STEP 6 | SIXTH SYSTEM | (FIRST SYSTEM) | X6 | - | C6 | - | - |
| | STEP 7 | SEVENTH SYSTEM | (SECOND SYSTEM) | X7 | - | C7 | - | - |
| | STEP 8 | EIGHTH SYSTEM | (THIRD SYSTEM) | X8 | Y8 | Z8 | - | - |
| | STEP 9 | NINTH SYSTEM | (FOURTH SYSTEM) | X9 | Y9 | Z9 | - | - |
| | STEP 10 | TENTH SYSTEM | (FIFTH SYSTEM) | X10 | Z10 | C10 | - | - |
| | FIVE-AXIS MACHINING STEP | 17TH SYSTEM | (SIXTH SYSTEM) | X17 | Y17 | Z17 | A17 | B17 |

| | STEP | SYSTEM WHOLE MACHINE | IN CONTROL UNIT | FIRST AXIS | SECOND AXIS | THIRD AXIS | FOURTH AXIS | FIFTH AXIS |
|---|---|---|---|---|---|---|---|---|
| CONTROL UNIT #3 | STEP 11 | 11TH SYSTEM | (FIRST SYSTEM) | X11 | Z11 | C11 | - | - |
| | STEP 12 | 12TH SYSTEM | (SECOND SYSTEM) | X12 | Y12 | Z12 | - | - |
| | STEP 13 | 13TH SYSTEM | (THIRD SYSTEM) | X13 | - | C13 | - | - |
| | STEP 14 | 14TH SYSTEM | (FOURTH SYSTEM) | X14 | - | C14 | - | - |
| | STEP 15 | 15TH SYSTEM | (FIFTH SYSTEM) | X15 | - | C15 | - | - |

FIG.17

| MACHINING PROGRAM<br>(12TH SYSTEM OF MACHINE)<br>(SECOND SYSTEM OF CONTROL UNIT #3) | CONTROL AXIS | | |
|---|---|---|---|
| | 12TH SYSTEM OF MACHINE | | |
| | SECOND SYSTEM OF CONTROL UNIT #3 | | |
| | X AXIS | Y AXIS | Z AXIS |
| N50 G140 X=X12 Y=Y12 Z=Z12;<br>　　G0 X10. ;<br>　　G1 X5. F1;<br>　　⋮ | X12 | Y12 | Z12 |
| N60 M100 ; (MACHINING UNIT REPLACEMENT COMMAND : FROM DRILLING TO TURNING)<br>　　G140 X=X16 Z=Z16 ;<br>　　G0 Z25. ;<br>　　G1 X8. F2;<br>　　⋮ | X16 | - | Z16 |
| N70 M101 ; (MACHINING UNIT REPLACEMENT COMMAND : FROM TURNING TO DRILLING)<br>　　G140 X=X12 Y=Y12 Z=Z12 ;<br>　　G0 X20. Z15. ;<br>　　G1 X15. F5;<br>　　⋮ | X12 | Y12 | Z12 |

FIG.21

| MACHINING PROGRAM<br>(12TH SYSTEM OF MACHINE)<br>(SECOND SYSTEM OF CONTROL UNIT #3) | CONTROL AXIS | | | | |
|---|---|---|---|---|---|
| | 12TH SYSTEM OF MACHINE | | | | |
| | SECOND SYSTEM OF CONTROL UNIT #3 | | | | |
| | X AXIS | Y AXIS | Z AXIS | A AXIS | B AXIS |
| N200 G140 X=X12 Y=Y12 Z=Z12;<br>  G0 X10. ;<br>  G1 X5. F1;<br>  ⋮ | X12 | Y12 | Z12 | - | - |
| N210 M100 ; (MACHINING UNIT REPLACEMENT COMMAND : FROM DRILLING TO FIVE-AXIS MACHINING)<br>  G140 X=X17 Y=Y17 Z=Z17 A=A17 B=B17;<br>  G0 Z25. ;<br>  G1 X1. Y1. Z1. A1. B1. F2;<br>  ⋮ | X17 | Y17 | Z17 | A17 | B17 |
| N220 M101 ;(MACHINING UNIT REPLACEMENT COMMAND : FROM FIVE-AXIS MACHINING TO DRILLING)<br>  G140 X=X12 Y=Y12 Z=Z12 ;<br>  G0 X20. Z15. ;<br>  G1 X15. F5;<br>  ⋮ | X12 | Y12 | Z12 | - | - |

NUMERICAL CONTROL DEVICE

CROSS-REFERENCE TO RELATED APPLICATION

The present application is based on PCT filing PCT/JP2017/045370, filed Dec. 18, 2017, the entire contents of which are incorporated herein by reference.

FIELD

The present invention relates to a numerical control (hereinafter also referred to as NC) device that controls a plurality of systems using a plurality of control units.

BACKGROUND

In a multi-axis machine tool such as a multi-spindle machine or a multi-station machine, a workpiece is moved to a plurality of stations, and the workpiece is machined at each station. In such a machine tool, generally, multi-system control is performed using a plurality of control units.

Patent Literature 1 discloses that two control units are connected by a communication path, and a plurality of systems are controlled by the two control units A and B. In Patent Literature 1, in each of the control units A and B, axis exchange is performed based on settings as to whether an axis of each system is a virtual axis, for example. A virtual axis is an axis of a system driven by the other control unit. In a case where the axis a designated by the machining program is a virtual axis, the control unit A acquires the control right for the axis a from the control unit B and outputs a position command to the control unit B. The control unit B drives the axis a according to the position command received from the control unit A. In this way, for example, the axis exchange for transferring the control right for the axis a from the control unit B to the control unit A is performed.

CITATION LIST

Patent Literature

Patent Literature 1: Japanese Patent No. 4840506

SUMMARY

Technical Problem

Patent Literature 1 discloses many setting items for axis exchange control, which makes the setting work complicated. In particular, in the case of three or more control units, more complicated setting items are required. In addition, Patent Literature 1 is only applied to the exchange of preset axes between two control units, and it is difficult for Patent Literature 1 to change an axis to be exchanged, add a system, add a control unit, and the like. In addition, it is difficult to dynamically exchange axes while the machine is operating.

The present invention has been made in view of the above, and an object thereof is to obtain a numerical control device capable of axis exchange control that is simple and provides a high degree of freedom in changing the machine configuration or control configuration.

Solution to Problem

In order to solve the above-described problems and achieve the object, a numerical control device according to the present invention includes a first control unit, a second control unit, and a shared area. The first control unit drives a first system axis based on a first machining program. The second control unit drives a second system axis based on a second machining program. The shared area is accessible by the first control unit and the second control unit. The first control unit includes a first axis exchange processing section that writes a first control right request for the second system axis to the shared area when executing an axis exchange command contained in the first machining program and designating the second system axis. The second control unit includes a second axis exchange processing section that determines, in response to the first control right request being written to the shared area, whether to permit the first control right request in accordance with a drive state of the second system axis, and writes a first response indicating a determination result to the shared area. The first axis exchange processing section determines acquisition of a control right for the second system axis based on the first response written to the shared area.

Advantageous Effects of Invention

The numerical control device according to the present invention can achieve the effect of implementing axis exchange control that is simple and provides a high degree of freedom in changing the machine configuration or control configuration.

BRIEF DESCRIPTION OF DRAWINGS

FIG. 3 is a diagram illustrating the axis definition for the numerical control device according to the first embodiment.

FIG. 8 is a flowchart illustrating an example of how a control unit operates when acquiring a control right request from another control unit according to the first embodiment.

FIG. 9 is a diagram illustrating the state that the shared area of each control unit is in when the block N10 of the machining programs in FIG. 6 is executed.

FIG. 14 is a diagram illustrating exemplary memory contents in an M code table according to the second embodiment.

FIG. 16 is a diagram illustrating the axis definition for the numerical control devices according to the third and fourth embodiments.

FIG. 17 is a diagram illustrating examples of machining programs applied to the third embodiment.

FIG. 21 is a diagram illustrating examples of machining programs applied to the fourth embodiment.

DESCRIPTION OF EMBODIMENTS

Hereinafter, a numerical control device according to embodiments of the present invention will be described in detail based on the drawings. The present invention is not limited to the embodiments.

First Embodiment

Figure 1:
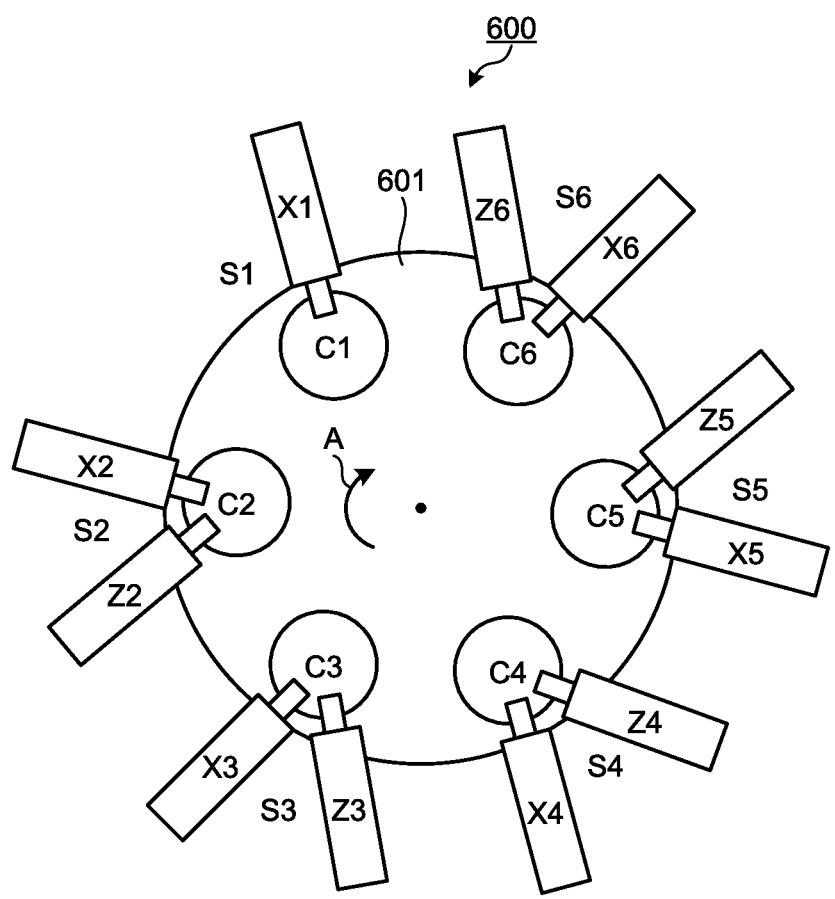
FIG. 1 is a conceptual diagram illustrating a processing machine that is driven by a numerical control device according to a first embodiment.

FIG. 1 is a diagram illustrating a processing machine 600 that is controlled by a numerical control device according to the first embodiment. This processing machine 600 is a multi-axis automatic lathe with a robot hand. The processing machine 600 includes a spindle drum 601 that rotates in the direction of the arrow A. Six spindles C1 to C6 are arranged on the spindle drum 601. A workpiece support (not illustrated) is attached to each of the spindles C1 to C6. These workpiece supports grip and rotate the workpiece to be machined. In FIG. 1, the spindle C1 is placed at a station S1 that is a first machining position, the spindle C2 is placed at a station S2 that is a second machining position, the spindle C3 is placed at a station S3 that is a third machining position, the spindle C4 is placed at a station S4 that is a fourth machining position, the spindle C5 is placed at a station S5 that is a fifth machining position, and the spindle C6 is placed at a station S6 that is a sixth machining position.

At the station S1, an X1 axis is placed as an NC axis for driving a first tool. At the station S2, an X2 axis and a Z2 axis are placed as NC axes for driving a second tool. At the station S3, an X3 axis and a Z3 axis are placed as NC axes for driving a third tool. At the station S4, an X4 axis and a Z4 axis are placed as NC axes for driving a fourth tool. At the station S5, an X5 axis and a Z5 axis are placed as NC axes for driving a fifth tool. At the station S6, an X6 axis and a Z6 axis are placed as NC axes for driving a sixth tool. The processing machine 600 includes a robot hand (not illustrated), and the robot hand can carry in and out a workpiece and reverse the workpiece placed at each of the stations S1 to S6.

For example, in the first cycle of a machining operation, machining is performed at the station S1 using the spindle C1 and the X1 axis, machining is performed at the station S2 using the spindle C2, the X2 axis, and the Z2 axis, machining is performed at the station S3 using the spindle C3, the X3 axis, and the Z3 axis, machining is performed at the station S4 using the spindle C4, the axis X4, and the axis Z4, machining is performed at the station S5 using the spindle C5, the X5 axis, and the Z5 axis, and machining is performed at the station S6 using the spindle C6, the axis X6, and the axis Z6.

In the second cycle, machining is performed at the station S1 using the spindle C2 and the X1 axis, machining is performed at the station S2 using the spindle C3, the X2 axis, and the Z2 axis, machining is performed at the station S3 using the spindle C4, the X3 axis, and the Z3 axis, machining is performed at the station S4 using the spindle C5, the axis X4, and the axis Z4, machining is performed at the station S5 using the spindle C6, the X5 axis, and the Z5 axis, and machining is performed at the station S6 using the spindle C1, the axis X6, and the axis Z6. After that, the spindle drum 601 turns once a cycle, and the spindle placed at each station changes sequentially. In this way, the machining operation for the workpiece is completed in six cycles.

Figure 2:
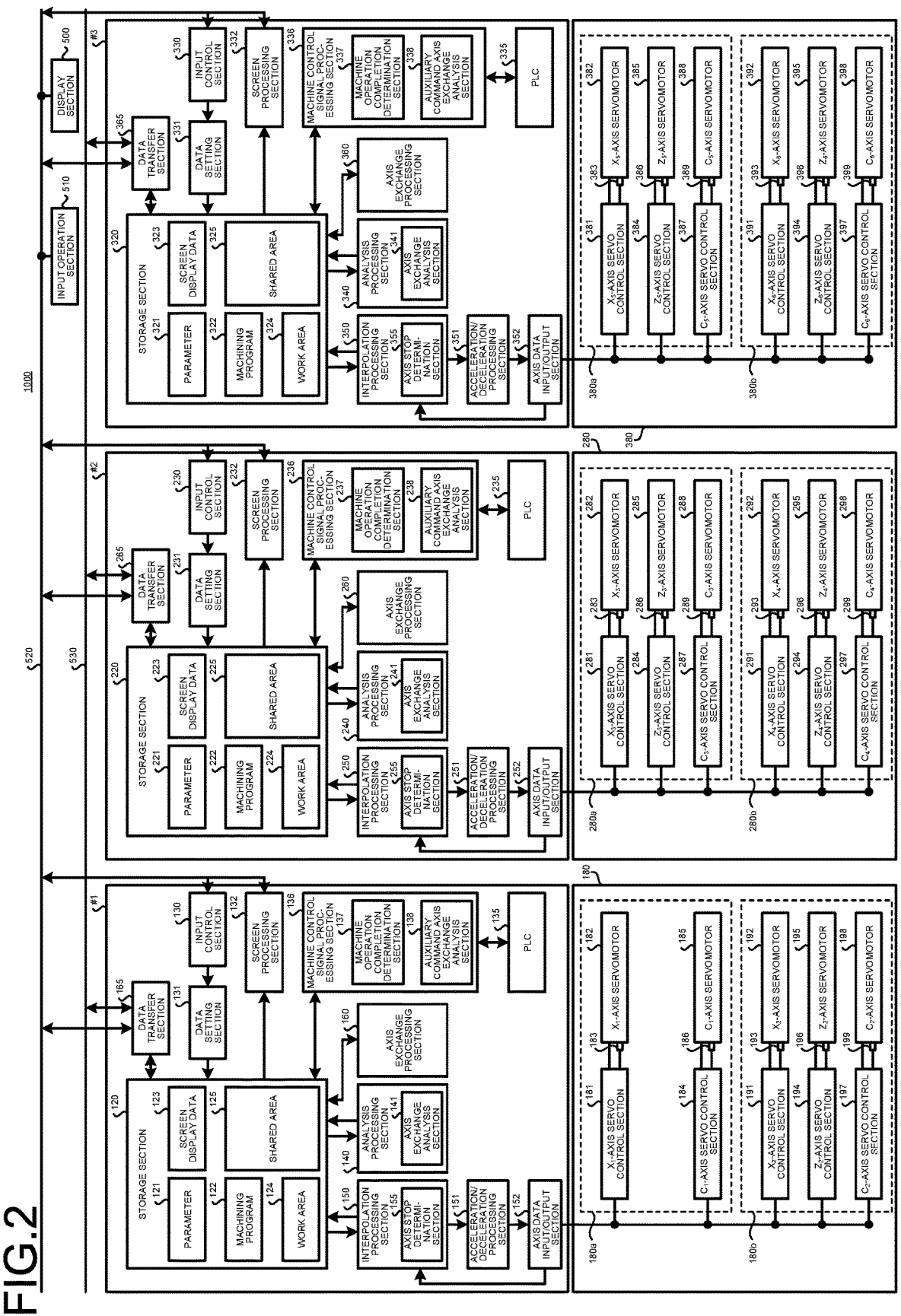
FIG. 2 is a block diagram illustrating an example of the internal configuration of the numerical control device according to the first embodiment.

FIG. 2 is a block diagram illustrating an exemplary configuration of a numerical control device 1000 according to the first embodiment of the present invention. This numerical control device 1000 drives and controls the processing machine 600 illustrated in FIG. 1. The numerical control device 1000 includes a display section 500, an input operation section 510, and a plurality of control units #1, #2, and #3. For example, the control unit #1 corresponds to the first control unit in the claims, and the control unit #2 corresponds to the second control unit in the claims. FIG. 2 depicts drive sections 180, 280, and 380, which are components of the processing machine 600. In this embodiment, the numerical control device 1000 includes the three control units #1, #2, and #3. The number of control units in the numerical control device 1000 may be freely determined, as long as it is two or more. The control unit #1 is connected to the drive section 180. The control unit #2 is connected to the drive section 280. The control unit #3 is connected to the drive section 380. The drive section 180 drives the spindle C1, the X1 axis, the spindle C2, the X2 axis, and the Z2 axis. The drive section 280 drives the spindle C3, the X3 axis, the Z3 axis, the spindle C4, the X4 axis, and the Z4 axis. The drive section 380 drives the spindle C5, the X5 axis, the Z5 axis, the spindle C6, the X6 axis, and the Z6 axis.

FIG. 3 is a diagram illustrating the axis definition for each control unit of the numerical control device 1000. The axes defined in this axis definition are the real axes of each control unit. The numerical control device 1000 includes six systems: the first to sixth systems, from the viewpoint of the whole machine. From the viewpoint of each control unit, the control units #1, #2, and #3 each have two systems: the first and second systems. A system basically indicates one or more axes that perform one of a plurality of machining steps and a drive system that drives the one or more axes. It can be said that one system corresponds to one machining unit that performs one machining step. Basically, the number of machining programs executed in parallel by the numerical control device is equal to the number of systems. According to the axis definition in FIG. 3, the first axis of the first system of the control unit #1 is set to the X1 axis, the second axis of the first system of the control unit #1 is set to undefined, and the third axis of the first system of the control unit #1 is set to the C1 axis. The first axis of the second system of the control unit #1 is set to the X2 axis, the second axis of the second system of the control unit #1 is set to the Z2 axis, and the third axis of the second system of the control unit #1 is set to the C2 axis.

The first axis of the first system of the control unit #2 is set to the X3 axis, the second axis of the first system of the control unit #2 is set to the Z3 axis, and the third axis of the first system of the control unit #2 is set to the C3 axis. The first axis of the second system of the control unit #2 is set to the X4 axis, the second axis of the second system of the control unit #2 is set to the Z4 axis, and the third axis of the second system of the control unit #2 is set to the C4 axis. The first axis of the first system of the control unit #3 is set to the X5 axis, the second axis of the first system of the control unit #3 is set to the Z5 axis, and the third axis of the first system of the control unit #3 is set to the C5 axis. The first axis of the second system of the control unit #3 is set to the X6 axis, the second axis of the second system of the control unit #3 is set to the Z6 axis, and the third axis of the second system of the control unit #3 is set to the C6 axis.

Returning to FIG. 2, the display section 500 and the input operation section 510 are network-connected to the control units #1, #2, and #3 via a first communication path 520. The control units #1, #2, and #3 are bus-connected via a second communication path 530. Between the control units #1, #2, and #3, various control data for axis exchange are transferred via the first communication path 520 or the second communication path 530. Note that axis exchange means to acquire the control right for a drive section that is under the control of another control unit. The display section 500 includes a display device such as a liquid crystal panel, for example, and displays screen display data 123, 223, and 323 received via the first communication path 520 such that the operator can visually recognize the screen display data. The input operation section 510 includes an input device such as a keyboard, a hardware switch, or a touch panel, for example.

The control units #1, #2, and #3 have the same internal configuration. The control units #1, #2, and #3 have separate central processing units (CPUs) and operate independently of one another. Each of the control units #1, #2, and #3 is implemented by a computer including a CPU, a read only memory (ROM), a random access memory (RAM), and an input/output (I/O) interface. Using the control unit #1, an example of the internal configuration of the control units #1, #2, and #3 will be described. The control unit #1 includes a storage section 120, an input control section 130, a data setting section 131, a screen processing section 132, a programmable controller (JIS B 3502: 2011, programmable logic controller (PLC)) 135, a machine control signal processing section 136, an analysis processing section 140, an interpolation processing section 150, an acceleration/deceleration processing section 151, an axis data input/output section 152, an axis exchange processing section 160, and a data transfer section 165.

The storage section 120 is configured by a ROM and/or a RAM. The storage section 120 stores a parameter 121, a machining program 122, and the screen display data 123. The storage section 120 includes a work area 124 and a shared area 125 that is used for transfer of control data between the control units #1, #2, and #3. The parameter 121 and the machining program 122 are input to the data setting section 131 via the first communication path 520 and the input control section 130 when the operator operates the input operation section 510. The data setting section 131 converts the format of the input parameter 121 and machining program 122 and stores them in the storage section 120.

The screen display data 123 stored in the storage section 120 are read by the screen processing section 132 and sent to the display section 500.

The shared area 125 stores control data for transfer between the control units #1, #2, and #3. The control data stored in the shared area 125 include a control right request signal and a response signal for axis exchange. The control data may also include a position command and a position feedback signal for controlling each axis. The data transfer section 165 cyclically transfers the control data stored in the shared area 125 to the other control units #2 and #3 at regular intervals. The data transfer section 165 stores, in the shared area 125, the control data cyclically transferred from the other control units #2 and #3. Accordingly, the shared areas 125, 225, and 325 of the control units #1, #2, and #3 basically store the same control data. Details of the shared area 125, details of the control data, and data transfer will be described later.

The PLC 135 executes sequence control of peripheral instruments for the processing machine 600 according to a sequence program. Peripheral instruments are instruments other than the spindles C1 to C6 and NC axes X1 to X6 and Z2 to Z6 of the processing machine 600, and include, for example, various sensors, various switches, the robot hand, and the like. In response to an automatic activation button (not illustrated) for activating the numerical control device 1000 being turned on, an automatic activation signal is input to the PLC 135 through a remote IO unit (not illustrated). The PLC 135 determines whether to start the operation of the connected control unit. To start the operation, the PLC 135 transmits the automatic activation signal to the machine control signal processing section 136. In response to receiving the automatic activation signal, the machine control signal processing section 136 instructs the analysis processing section 140 to start executing the machining program 122 via the work area 124 of the storage section 120, for example. In response to being instructed to start executing the machining program 122, the analysis processing section 140 starts reading the machining program 122 from the storage section 120.

The machine control signal processing section 136 includes a machine operation completion determination section 137 and an auxiliary command axis exchange analysis section 138. The machine operation completion determination section 137 determines whether the operation of a peripheral instrument has been completed based on a signal from the PLC 135. For example, the machine operation completion determination section 137 stores, in the work area 124, information indicating the machine operation state of the robot hand based on a signal from the PLC 135. The machine operation state includes, for example, information indicating whether the workpiece reversing operation is being executed or has been completed. The interpolation processing section 150 refers to the information indicating the machine operation state stored in the work area 124, and determines whether the workpiece reversing operation has been completed. The interpolation processing section 150 stops interpolation processing while the workpiece reversing is being executed.

The auxiliary command axis exchange analysis section 138 operates when the machining program 122 contains an M code that is an auxiliary command. The auxiliary command axis exchange analysis section 138 acquires the command content corresponding to the M code from the PLC 135, and analyzes the acquired command content. Details of the auxiliary command axis exchange analysis section 138 will be described in the second embodiment.

The analysis processing section 140 reads the machining program 122 from the storage section 120 in accordance with the activation instruction from the machine control signal processing section 136, analyzes each block (each row) of the machining program 122, and passes a position command for each axis to the interpolation processing section 150 as the analysis result. Alternatively, the analysis processing section 140 writes, to the shared area 125, the analysis result of each block of the machining program 122. A position command for each axis includes a rotation command for a C axis, which is a spindle, in addition to a position command for an X axis or Z axis. In this specification, a position command may include a rotation command for a spindle. The analysis processing section 140 includes an axis exchange analysis section 141. In a case where an axis exchange command is contained in the machining program 122, the axis exchange analysis section 141 analyzes the block containing the axis exchange command G140 in the machining program 122 and passes the analysis result to the axis exchange processing section 160. As an axis exchange command, any NC code may be adopted instead of G140.

The axis exchange processing section 160 performs axis exchange control between the control units. If the axis designated by G140 in the machining program 122 is a real axis of the own control unit #1, the axis exchange processing section 160 confirms using the shared area 125 whether the own control unit or another control unit has the control right for this real axis. In response to successfully acquiring the control right, the axis exchange processing section 160 notifies the axis exchange analysis section 141 of the successful acquisition of the control right. Upon receiving the notification, the axis exchange analysis section 141 analyzes the block next to the block containing G140, and passes the analyzed position command to the interpolation processing section 150.

If the axis designated by G140 in the machining program 122 is not a real axis of the own control unit #1 but a real axis of another control unit #2 or #3, the axis exchange processing section 160 requests the control right for the axis designated by G140 to that control unit via the shared area 125. In response to successfully acquiring the control right via the shared area 125, the axis exchange processing section 160 analyzes blocks subsequent to the block containing G140, and transfers the analyzed position command to the other control units #2 and #3 via the shared area 125.

The axis exchange processing section 160 also checks a control right request from another control unit #2 or #3 to the own control unit #1 via the shared area 125, and writes, to the shared area 125, a response signal for the control right request in accordance with the state of the own control unit #1. The response to the control right request from another control unit is performed by the control unit connected to the real axis, not by the control unit having the control right. For example, if the control unit #2 has the control right for the C1 axis and receives a control right request for the C1 axis from the control unit #3, not the control unit #2 but the control unit #1 having the C1 axis as its real axis responds to the control right request for the C1 axis.

The interpolation processing section 150 acquires, from the axis data input/output section 152, feedback signals FB (hereinafter also referred to as FB signals) of sensors 183, 186, 193, 196, and 199 in the drive section 180. The interpolation processing section 150 receives an X-axis or Z-axis position command as an analysis result from the analysis processing section 140 via the work area 124, performs interpolation processing based on the received position command and FB signals acquired from the axis data input/output section 152, and passes a movement amount command to the acceleration/deceleration processing section 151 as the result of the interpolation processing. The interpolation processing section 150 also receives a rotational speed command for a spindle motor from the analysis processing section 140 via the work area 124 and passes the rotational speed command to the acceleration/deceleration processing section 151. The interpolation processing section 150 also writes, to the shared area 125, the feedback signals FB acquired from the axis data input/output section 152.

The interpolation processing section 150 includes an axis stop determination section 155. Based on the FB signals, the axis stop determination section 155 determines whether the NC axes (X1, X2, and Z2 axes) and the spindles (C1 and C2 axes) connected to the own control unit #1 are stationary or being driven, and writes an axis stop signal indicating the determination result to the work area 124. The axis exchange processing section 160 refers to the axis stop signal stored in the work area 124 and determines whether the axes connected to the own control unit #1 are being driven.

The acceleration/deceleration processing section 151 performs acceleration/deceleration processing on the X-axis or Z-axis movement amount command supplied from the interpolation processing section 150. The acceleration/deceleration processing section 151 outputs the X-axis or Z-axis movement amount command subjected to the acceleration/deceleration processing to the axis data input/output section 152. In the case of a spindle rotation command, the acceleration/deceleration processing section 151 outputs the rotational speed command to the axis data input/output section 152 without performing acceleration/deceleration processing.

The axis data input/output section 152 outputs the X-axis or Z-axis movement amount command and the C-axis rotational speed command supplied from the acceleration/deceleration processing section 151 to the drive section 180. The axis data input/output section 152 also passes the X-axis, Z-axis, and C-axis FB signals input from the drive section 180 to the interpolation processing section 150.

The drive section 180 includes two drive systems. A first drive system 180a includes an X1-axis servo control section 181, an X1-axis servomotor 182, an X1-axis sensor 183, a C1-axis servo control section 184, a C1-axis servomotor 185, and a C1-axis sensor 186. The X1-axis servo control section 181 performs position feedback control of the X1-axis servomotor 182 according to the X1-axis movement amount command input from the axis data input/output section 152 and the position data input from the X1-axis sensor 183. The X1-axis servo control section 181 also outputs the position data input from the X1-axis sensor 183 to the axis data input/output section 152 as an FB signal. The C1-axis servo control section 184 performs speed feedback control or position feedback control of the C1-axis servomotor 185 according to the C1-axis rotational speed command input from the axis data input/output section 152 and the speed data or position data input from the C1-axis sensor 186. The C1-axis servo control section 184 also outputs the speed data or position data input from the C1-axis sensor 186 to the axis data input/output section 152 as an FB signal.

A second system drive system 180b includes an X2-axis servo control section 191, an X2-axis servomotor 192, an X2-axis sensor 193, a Z2-axis servo control section 194, a Z2-axis servomotor 195, a Z2-axis sensor 196, a C2-axis servo control section 197, a C2-axis servomotor 198, and a C2-axis sensor 199. The X2-axis servo control section 191 performs position feedback control of the X2-axis servomotor 192 according to the X2-axis movement amount command input from the axis data input/output section 152 and the position data input from the X2-axis sensor 193. The X2-axis servo control section 191 also outputs the position data input from the X2-axis sensor 193 to the axis data input/output section 152 as an FB signal. The Z2-axis servo control section 194 performs position feedback control of the Z2-axis servomotor 195 according to the Z2-axis movement amount command input from the axis data input/output section 152 and the position data input from the Z2-axis sensor 196. The Z2-axis servo control section 194 also outputs the position data input from the Z2-axis sensor 196 to the axis data input/output section 152 as an FB signal. The C2-axis servo control section 197 performs speed feedback control or position feedback control of the C2-axis servomotor 198 according to the C2-axis rotational speed command input from the axis data input/output section 152 and the speed data or position data input from the C2-axis sensor 199. The C2-axis servo control section 197 also outputs the speed data or position data input from the C2-axis sensor 199 to the axis data input/output section 152 as an FB signal. Note that, for example, the X1 axis and the C1 axis correspond to the first system axis in the claims.

The control unit #2 includes a storage section 220, an input control section 230, a data setting section 231, a screen processing section 232, a PLC 235, a machine control signal processing section 236 including a machine operation completion determination section 237 and an auxiliary command axis exchange analysis section 238, an analysis processing section 240 including an axis exchange analysis section 241, an interpolation processing section 250 including an axis stop determination section 255, an acceleration/deceleration processing section 251, an axis data input/output section 252, an axis exchange processing section 260, and a data transfer section 265. The storage section 220 stores a parameter 221, a machining program 222, and the screen display data 223. The storage section 220 includes a work area 224 and the shared area 225 that is used for transfer of control data between the control units #1, #2, and #3.

The drive section 280 includes a first drive system 280a and a second drive system 280b. The first drive system 280a includes an X3-axis servo control section 281, an X3-axis servomotor 282, an X3-axis sensor 283, a Z3-axis servo control section 284, a Z3-axis servomotor 285, a Z3-axis sensor 286, a C3-axis servo control section 287, a C3-axis servomotor 288, and a C3-axis sensor 289. The second drive system 280b includes an X4-axis servo control section 291, an X4-axis servomotor 292, an X4-axis sensor 293, a Z4-axis servo control section 294, a Z4-axis servomotor 295, a Z4-axis sensor 296, a C4-axis servo control section 297, a C4-axis servomotor 298, and a C4-axis sensor 299. Note that, for example, the X3 axis, the Z3 axis, and the C3 axis correspond to the second system axis in the claims.

The control unit #3 includes a storage section 320, an input control section 330, a data setting section 331, a screen processing section 332, a PLC 335, a machine control signal processing section 336 including a machine operation completion determination section 337 and an auxiliary command axis exchange analysis section 338, an analysis processing section 340 including an axis exchange analysis section 341, an interpolation processing section 350 including an axis stop determination section 355, an acceleration/deceleration processing section 351, an axis data input/output section 352, an axis exchange processing section 360, and a data transfer section 365. The storage section 320 stores a parameter 321, a machining program 322, and the screen display data 323. The storage section 320 includes a work area 324 and the shared area 325 that is used for transfer of control data between the control units #1, #2, and #3.

The drive section 380 includes a first drive system 380a and a second drive system 380b. The first drive system 380a includes an X5-axis servo control section 381, an X5-axis servomotor 382, an X5-axis sensor 383, a Z5-axis servo control section 384, a Z5-axis servomotor 385, a Z5-axis sensor 386, a C5-axis servo control section 387, a C5-axis servomotor 388, and a C5-axis sensor 389. The second drive system 380b includes an X6-axis servo control section 391, an X6-axis servomotor 392, an X6-axis sensor 393, a Z6-axis servo control section 394, a Z6-axis servomotor 395, a Z6-axis sensor 396, a C6-axis servo control section 397, a C6-axis servomotor 398, and a C6-axis sensor 399.

Figure 4:
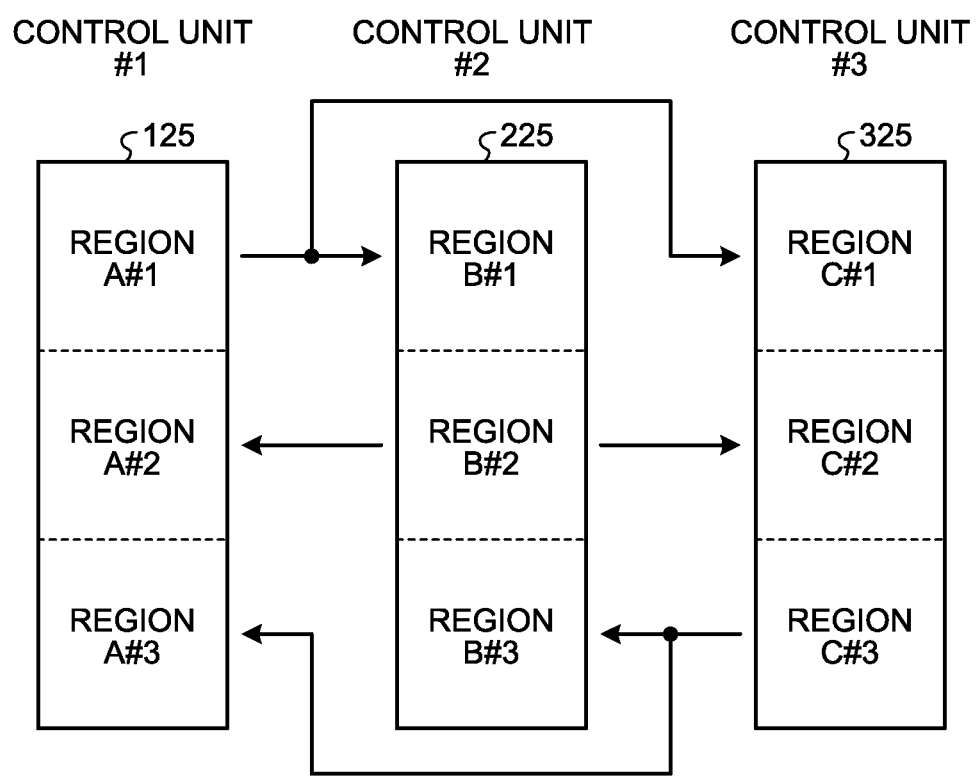
FIG. 4 is a diagram illustrating storage areas of a shared area of each control unit according to the first embodiment.

FIG. 4 is a diagram illustrating storage areas of the shared area 125 of the control unit #1, the shared area 225 of the control unit #2, and the shared area 325 of the control unit #3. The shared area 125 of the control unit #1 includes a region A #1, a region A #2, and a region A #3. In the region A #1, the control data written by the control unit #1 are stored. In the region A #2, the control data transferred from a region B #2 of the control unit #2 via the data transfer section 165 are stored. In the region A #3, the control data transferred from a region C #3 of the control unit #3 via the data transfer section 165 are stored. For example, the shared area 125 corresponds to the first shared area in the claims. The region A #1 corresponds to the first region in the claims, and the region A #2 corresponds to the second region in the claims.

The shared area 225 of the control unit #2 includes a region B #1, the region B #2, and a region B #3. In the region B #1, the control data transferred from the region A #1 of the control unit #1 via the data transfer section 265 are stored. In the region B #2, the control data written by the control unit #2 are stored. In the region B #3, the control data transferred from the region C #3 of the control unit #3 via the data transfer section 265 are stored. For example, the shared area 225 corresponds to the second shared area in the claims. The region B #2 corresponds to the third region in the claims, and the region B #1 corresponds to the fourth region in the claims.

The shared area 325 of the control unit #3 includes a region C #1, a region C #2, and the region C #3. In the region C #1, the control data transferred from the region A #1 of the control unit #1 via the data transfer section 365 are stored. In the region C #2, the control data transferred from the region B #2 of the control unit #2 via the data transfer section 365 are stored. In the region C #3, the control data written by the control unit #3 are stored.

As described above, the control data transferred between the control unit #1, the control unit #2, and the control unit #3 include a control right request for axis exchange and a response signal to the control right request. In the first embodiment, the control data include a position command for a real axis of another control unit and an FB signal about a real axis of the own control unit.

Figure 5:
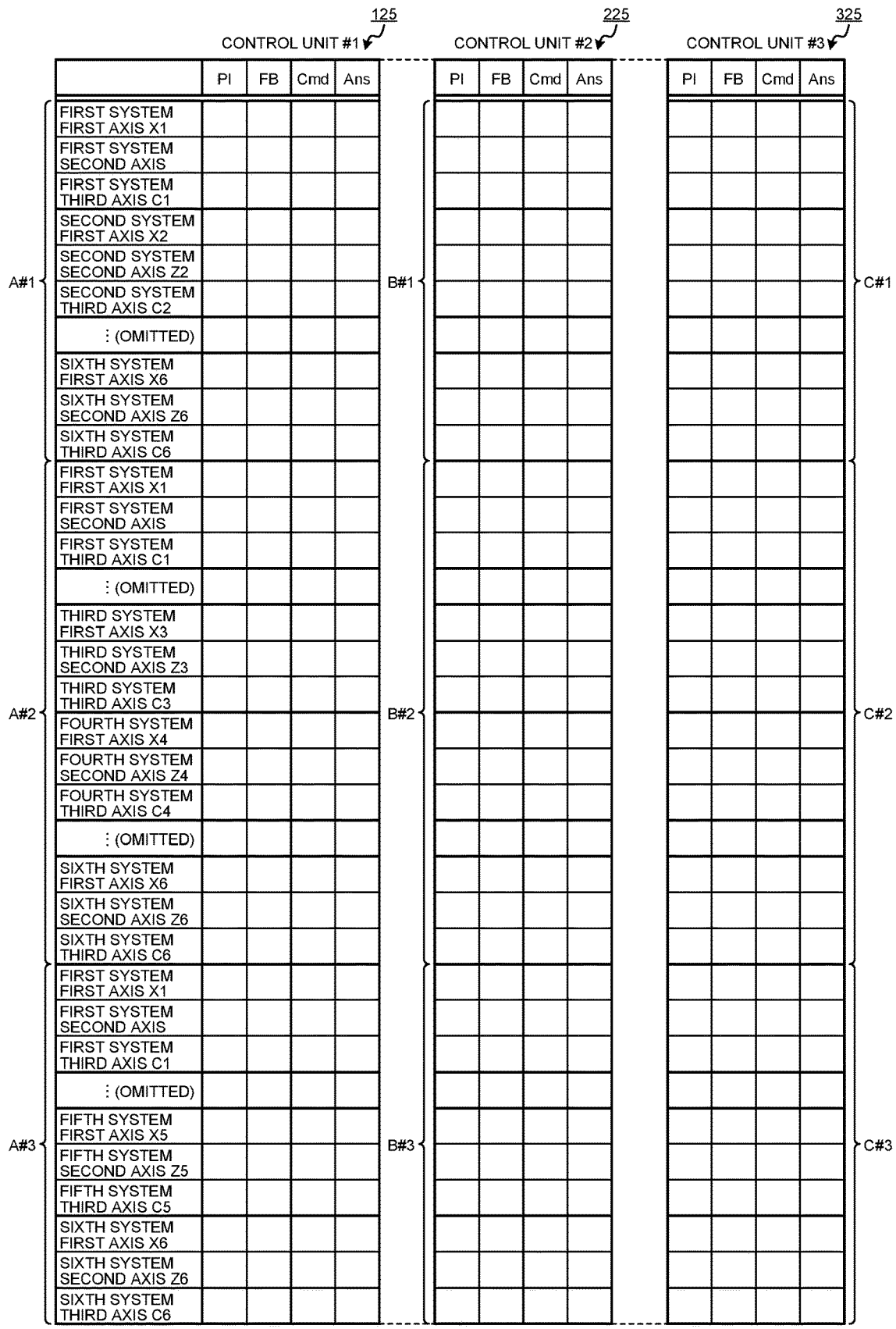
FIG. 5 is a diagram illustrating exemplary memory contents in the shared area of each control unit according to the first embodiment.

FIG. 5 is a diagram illustrating details of control data stored in each of the regions A #1 to A #3, B #1 to B #3, and C #1 to C #3 of the shared area 125, the shared area 225, and the shared area 325 illustrated in FIG. 4. The regions A #1 to A #3, the regions B #1 to B #3, and the regions C #1 to C #3 each can store control data related to a plurality of axes of a plurality of systems. In FIG. 5, in order to control the processing machine 600 illustrated in FIG. 1, each of the regions A #1 to A #3, B #1 to B #3, and C #1 to C #3 can store control data for the first axis (X axis), second axis (Z axis), and third axis (C axis) included in the first system, control data for the first axis (X axis), second axis (Z axis), and third axis (C axis) included in the second system, . . . , and control data for the first axis (X axis), second axis (Z axis), and third axis (C axis) included in the sixth system.

The entry of each axis formed in each of the regions A #1 to A #3, B #1 to B #3, and C #1 to C #3 includes, as described above, a command field Cmd including a control right request for axis exchange, a response signal field Ans, a position command field PI, and an FB signal field FB.

For example, to the position command field PI of the region A #1 of the shared area 125 of the control unit #1, a position command designated by the machining program 122 executed by the control unit #1 is written by the control unit #1. To the FB signal field FB of the region A #1 of the shared area 125 of the control unit #1, FB signals for the first axis (X1 axis), second axis, and third axis (C1 axis) of the first system connected to the control unit #1 and FB signals for the first axis (X2 axis), second axis (Z2 axis), and third axis (C2 axis) of the second system are written by the control unit #1.

To the command field Cmd of the region A #1 of the shared area 125 of the control unit #1, data for identifying which of the control units #1 to #3 has requested the control right are written. Specifically, data for identifying which of the control units #1 to #3 has requested the control right are written to the command field Cmd of the entry corresponding to the axis associated with the control right request. For example, in a case where the control unit #1 requests the control right for the third axis (C6 axis) of the sixth system, the control unit number "#1" is written to the command field Cmd of the C6 axis, for example. In addition to the control unit number, any information that can be used to identify which control unit has requested the control right may be written to the command field Cmd of each axis.

To the response signal field Ans of the region A #1 of the shared area 125 of the control unit #1, a response signal that is a response from the control unit #1 to the control right request from another control unit #2 or #3 is written. To the response signal field Ans, a permission signal OK for permitting the control right request or a non-permission signal NG for not permitting the control right request is written by the control unit #1.

To the position command field PI of the region B #2 of the shared area 225 of the control unit #2, a position command designated by the machining program 222 executed by the control unit #2 is written by the control unit #2. To the FB signal field FB of the region B #2 of the shared area 225 of the control unit #2, FB signals for the first axis (X3 axis), second axis (Z3 axis), and third axis (C3 axis) of the third system connected to the control unit #2 and FB signals for the first axis (X4 axis), second axis (Z4 axis), and third axis (C4 axis) of the fourth system are written by the control unit #2.

To the command field Cmd of the region B #2 of the shared area 225 of the control unit #2, data for identifying which of the control units #1 to #3 has requested the control right are written. For example, in a case where the control unit #2 requests the control right for the third axis (C1 axis) of the first system, the control unit number "#2" is written to the command field Cmd of the C1 axis, for example.

To the response signal field Ans of the region B #2 of the shared area 225 of the control unit #2, a response signal that is a response from the control unit #2 to the control right request from another control unit #1 or #3 is written.

To the position command field PI of the region C #3 of the shared area 325 of the control unit #3, a position command designated by the machining program 322 executed by the control unit #3 is written by the control unit #3. To the FB signal field FB of the region C #3 of the shared area 325 of the control unit #3, FB signals for the first axis (X5 axis), second axis (Z5 axis), and third axis (C5 axis) of the fifth system connected to the control unit #3 and FB signals for the first axis (X6 axis), second axis (Z6 axis), and third axis (C6 axis) of the sixth system are written by the control unit #3.

To the command field Cmd of the region C #3 of the shared area 325 of the control unit #3, data for identifying which of the control units #1 to #3 has requested the control right are written. For example, in a case where the control unit #3 requests the control right for the third axis (C1 axis) of the first system, the control unit number "#3" is written to the command field Cmd of the C1 axis, for example.

To the response signal field Ans of the region C #3 of the shared area 325 of the control unit #3, a response signal that is a response from the control unit #3 to the control right request from another control unit #1 or #2 is written.

As described above, the control data transferred from the region B #2 of the control unit #2 are stored in the region A #2 of the control unit #1. The control data transferred from the region C #3 of the control unit #3 are stored in the region A #3 of the control unit #1. The control data transferred from the region A #1 of the control unit #1 are stored in the region B #1 of the control unit #2. The control data transferred from the region C #3 of the control unit #3 are stored in the region B #3 of the control unit #2. The control data transferred from the region A #1 of the control unit #1 are stored in the region C #1 of the control unit #3. The control data transferred from the region B #2 of the control unit #2 are stored in the region C #2 of the control unit #3.

Figure 6:
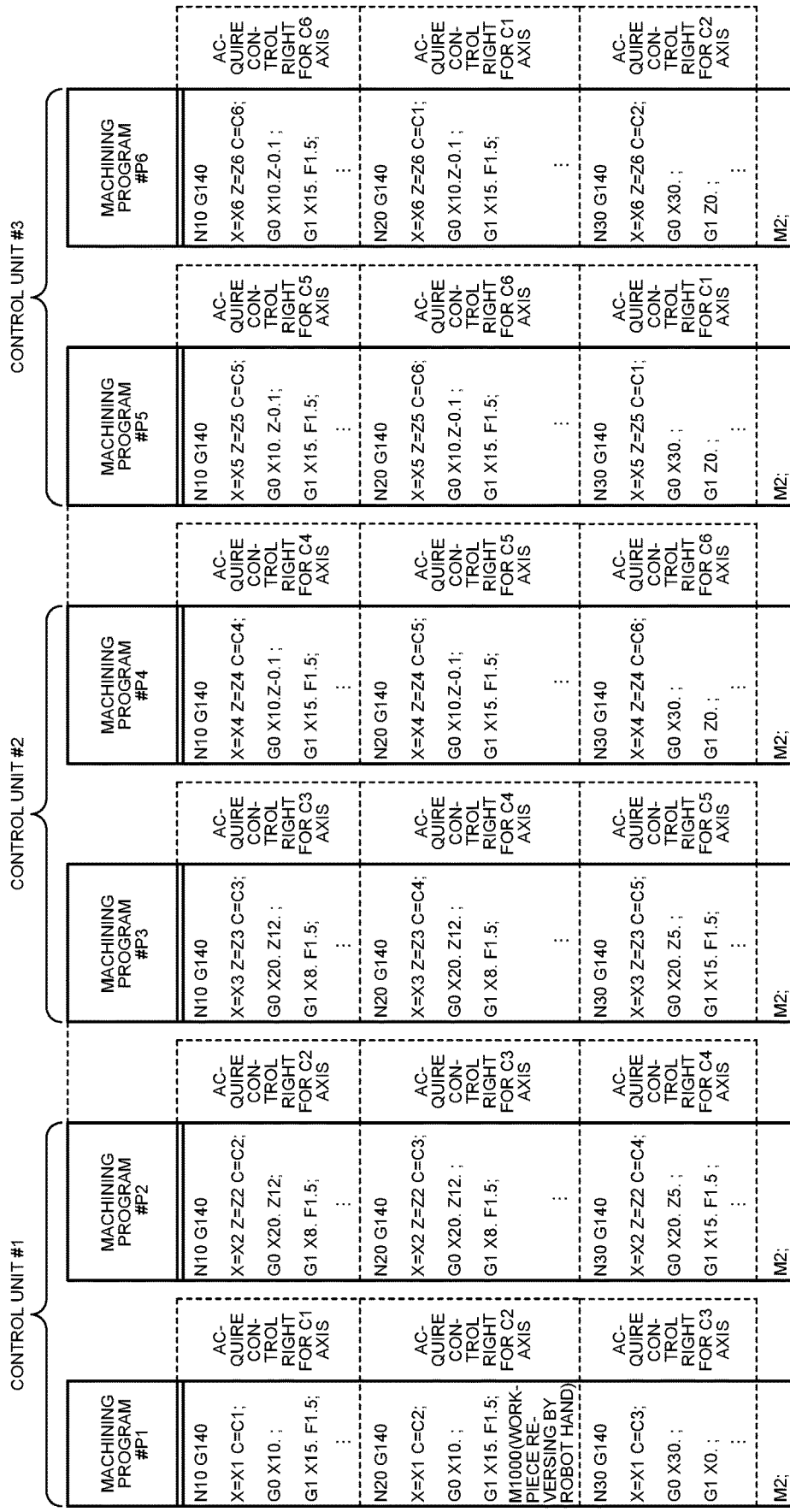
FIG. 6 is a diagram illustrating examples of machining programs applied to the first embodiment.

FIG. 6 is a diagram illustrating examples of machining programs for controlling the processing machine 600. Machining programs #P1 and #P2 correspond to the machining program 122 and are executed in parallel by the control unit #1. Machining programs #P3 and #P4 correspond to the machining program 222 and are executed in parallel by the control unit #2. Machining programs #P5 and #P6 correspond to the machining program 322 and are executed in parallel by the control unit #3. The machining program #P1 corresponds to the first machining program in the claims, for example. The machining program #P3 corresponds to the second machining program in the claims, for example.

In the blocks N10, N20, and N30 of the machining programs #P1 to #P6, axis exchange commands are described. Specifically, "G140 X=X1 C=C1" is described in the block N10 of the machining program #P1, "G140 X=X2 Z=Z2 C=C2" is described in the block N10 of the machining program #P2, "G140 X=X3 Z=Z3 C=C3" is described in the block N10 of the machining program #P3, "G140 X=X4 Z=Z4 C=C4" is described in the block N10 of the machining program #P4, "G140 X=X5 Z=Z5 C=C5" is described in the block N10 of the machining program #P5, and "G140 X=X6 Z=Z6 C=C6" is described in the block N10 of the machining program #P6. At the stage of the block N10, axis exchange is not performed.

In addition, "G140 X=X1 C=C2" is described in the block N20 of the machining program #P1, "G140 X=X2 Z=Z2 C=C3" is described in the block N20 of the machining program #P2, "G140 X=X3 Z=Z3 C=C4" is described in the block N20 of the machining program #P3, "G140 X=X4 Z=Z4 C=C5" is described in the block N20 of the machining program #P4, "G140 X=X5 Z=Z5 C=C6" is described in the block N20 of the machining program #P5, and "G140 X=X6 Z=Z6 C=C1" is described in the block N20 of the machining program #P6. At the stage of the block N20, axis exchange is performed between the control units #1, #2, and #3.

In addition, "G140 X=X1 C=C3" is described in the block N30 of the machining program #P1, "G140 X=X2 Z=Z2 C=C4" is described in the block N30 of the machining program #P2, "G140 X=X3 Z=Z3 C=C5" is described in the block N30 of the machining program #P3, "G140 X=X4 Z=Z4 C=C6" is described in the block N30 of the machining program #P4, "G140 X=X5 Z=Z5 C=C1" is described in the block N30 of the machining program #P5, and "G140 X=X6 Z=Z6 C=C2" is described in the block N30 of the machining program #P6. At the stage of the block N30, axis exchange is performed between the control units #1, #2, and #3.

Figure 7:
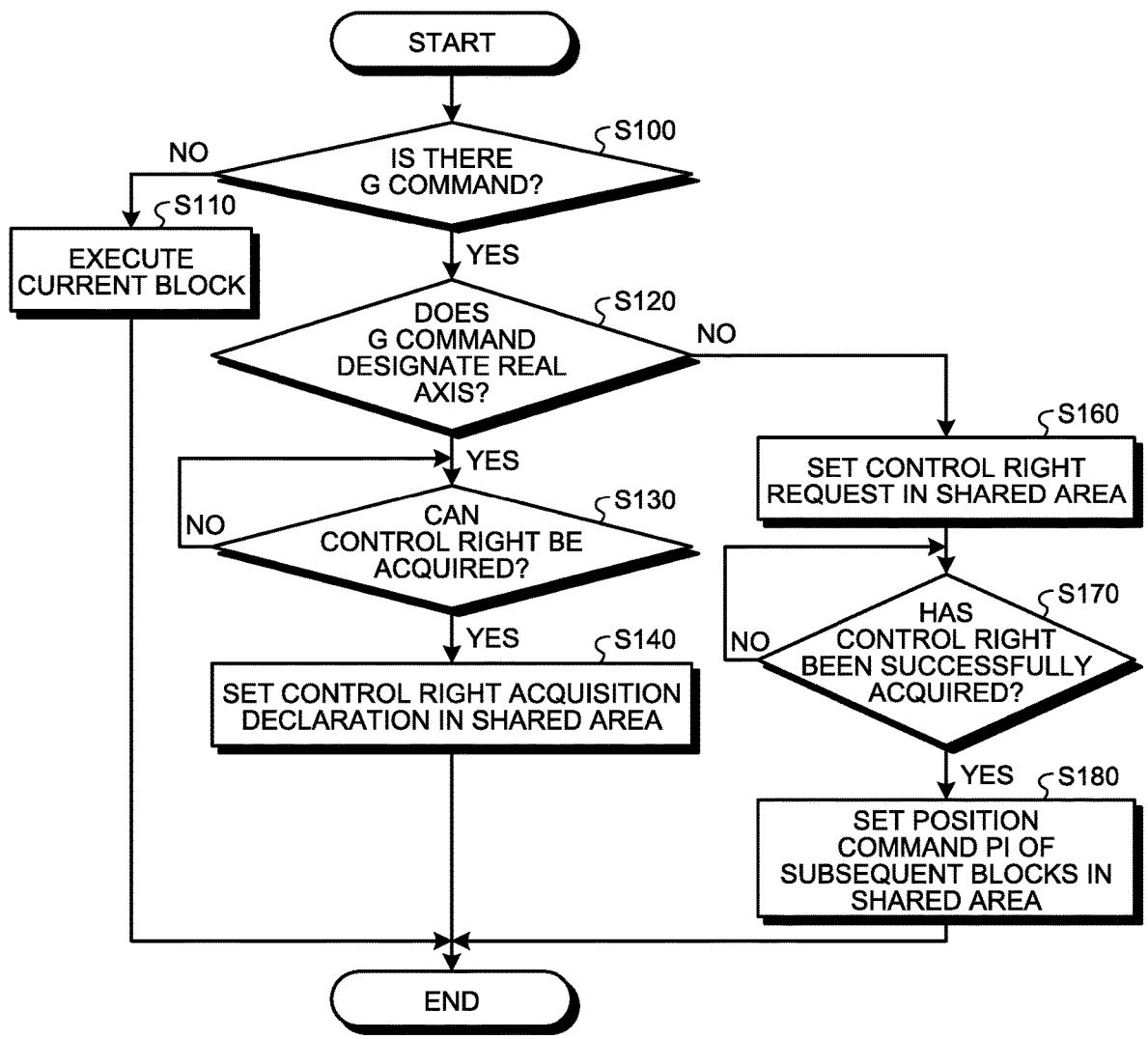
FIG. 7 is a flowchart illustrating an example of how a control unit operates when executing a machining program according to the first embodiment.

FIGS. 7 and 8 are diagrams illustrating exemplary control procedures for axis exchange that are executed by the control units #1, #2, and #3. FIG. 7 depicts a processing procedure that is executed by the control units #1, #2, and #3 when a machining program is executed. FIG. 8 depicts a processing procedure that is executed when a control right request is received from another control unit. Hereinafter, the processing procedures of FIGS. 7 and 8 will be described by taking the operation of the control unit #1 as an example.

The processing procedure of FIG. 7 will be described. When analyzing each block of the machining program 122, the analysis processing section 140 determines whether G140 as an axis exchange command is described in the analysis target block (S100). If the current analysis target block does not contain G140 (S100: No), the analysis processing section 140 analyzes this current block and passes the analysis result to the interpolation processing section 150 via the work area 124 (S110). As described above, this analysis result is output to the drive section 180 via the acceleration/deceleration processing section 151 and the axis data input/output section 152, and drive control is executed by the drive section 180 in accordance with the command of the current block.

If the analysis target block contains an axis exchange command (G140) (S100: Yes), the axis exchange analysis section 141 analyzes the axis exchange command and determines, based on the axis definition illustrated in FIG. 3, whether the axis designated by G140 is a real axis or an axis connected to another control unit (S120). In the case of the processing machine 600 illustrated in FIG. 1, only the C axes are subjected to axis exchange. Therefore, the following description refers mainly to the C axes. The axis exchange analysis section 141 determines whether the C axis designated by G140 is a real axis (C1 axis or C2 axis). If the axis designated by G140 is a real axis (S120: Yes), the axis exchange analysis section 141 determines whether to acquire the control right for the system including the axis designated by G140 based on the axis stop state of the drive section 180 connected to the own control unit #1, the operating state of the robot hand, and the like (S130).

The stop state of each axis included in the drive section 180 is determined by the axis stop determination section 155. As described above, the interpolation processing section 150 receives, via the axis data input/output section 152, FB signals from the sensors 183, 186, 193, 196, and 199 for the respective axes (X1, C1, X2, Z2, and C2 axes) included in the drive section 180. The axis stop determination section 155 determines whether each axis included in the drive section 180 is stationary based on the FB signals from these sensors. The axis stop determination section 155 notifies the axis exchange analysis section 141 of the stop state of each axis via the work area 124.

The operating states of peripheral instruments including the operating state of the robot hand are determined by the machine operation completion determination section 137. The machine operation completion determination section 137 notifies the axis exchange analysis section 141 via the work area 124 of the machine operation state indicating the execution or end of the workpiece reversing by the robot hand (M1000).

The axis exchange analysis section 141 confirms the axis stop of the system including the axis designated by G140 through the notification from the axis stop determination section 155, and confirms the stop of the robot hand based on the notification from the machine operation completion determination section 137. Then, the axis exchange analysis section 141 determines to acquire the control right for the system including the axis designated by G140. In response to determining that the control right can be acquired (S130: Yes), the axis exchange processing section 160 sets a control right acquisition declaration for the axis designated by G140 in the region A #1 of the shared area 125 (S140). For example, the control right acquisition declaration is implemented by setting the control unit number "#1" in the command field Cmd and setting "OK" in the response signal field Ans. For example, when the control unit #1 declares the acquisition of the control right for the C1 axis that is a real axis, the control unit #1 sets the control unit number "#1" in the command field Cmd of the C1 axis in the region A #1 and sets "OK" in the response signal field Ans of the C1 axis in the region A #1. Next, the axis exchange analysis section 141 analyzes subsequent blocks of the machining program 122 and outputs the analysis result to the interpolation processing section 150. The analysis result is output to the drive section 180 via the acceleration/deceleration processing section 151 and the axis data input/output section 152, and drive control is executed by the drive section 180 in accordance with the commands of the subsequent blocks.

If the axis exchange command (G140) designates a real axis of another control unit #2 or #3 (S120: No), the axis exchange analysis section 141 passes the analysis result of the block to the axis exchange processing section 160. The axis exchange processing section 160 sets a control right request for the axis designated by G140 in the region A #1 of the shared area 125 (S160). Specifically, the axis exchange processing section 160 sets the control unit number "#1" in the command field Cmd of the entry of the axis designated by the axis exchange command in the region A #1 of the shared area 125. For example, in a case where the control unit #1 requests the control right for the third axis (C3 axis) of the third system, the control unit number "#1" is set in the command field Cmd of the C3 axis in the region A #1. The data transfer section 165 transfers the control data stored in the region A #1 of the shared area 125 to the other control units #2 and #3 via the second communication path 530.

The data transfer section 165 stores the control data received from the control unit #2 in the region A #2 of the shared area 125, and stores the control data received from the control unit #3 in the region A #3 of the shared area 125. The axis exchange processing section 160 searches the regions A #2 and A #3 of the shared area 125, and receives a response signal Ans from another control unit #2 or #3 for the control right request. The axis exchange processing section 160 determines whether the control right has been successfully acquired based on the content of the received response signal Ans (S170). If the response signal Ans indicates non-permission NG, the axis exchange analysis section 141 stands by until a response signal Ans indicating permission OK is received. If the axis exchange processing section 160 receives a response signal Ans indicating permission OK, which means that the control right has been successfully acquired (S170: Yes), the axis exchange processing section 160 notifies the axis exchange analysis section 141 of the successful acquisition of the control right. The axis exchange analysis section 141 analyzes subsequent blocks of the machining program 122 and sets a position command as the analysis result in the position command field PI of the entry of the axis designated by the axis exchange command in the region A #1 of the shared area 125 (S180). The data transfer section 165 transfers the control data stored in the region A #1 of the shared area 125 to the shared area 225 of the control unit #2 and the shared area 325 of the control unit #3 via the second communication path 530. Another control unit #2 or #3 executes interpolation processing, acceleration/deceleration processing, and axis data output processing according to the position command PI received from the control unit #1. Consequently, the axis connected to the control unit #2 or #3 is driven and controlled based on the position command PI given by the control unit #1.

The processing procedure of FIG. 8 will be described. As described above, the response to a control right request from another control unit is performed by the control unit having the axis associated with the control right request as its real axis, not by the control unit having the control right. Therefore, the entity that executes the processing in FIG. 8 is the control unit having the axis associated with the control right request as its real axis. Hereinafter, FIG. 8 will be described as the operation of the control unit #1. The axis exchange processing section 160 cyclically searches the regions A #2 and A #3 of the shared area 125. Based on this search, the axis exchange processing section 160 checks whether a control right request for the C1 or C2 axis has been received from another control unit #2 or #3 (S200). If a control right request has been received from another control unit #2 or #3 (S210: Yes), the axis exchange processing section 160 determines whether to assign the control right for the axis associated with the control right request based on the axis stop state of the drive section 180 connected to the own control unit #1, the operating state of the robot hand, and the like (S220).

As described above, the stop state of each axis included in the drive section 180 is determined by the axis stop determination section 155. The operating state of the robot hand is determined by the machine operation completion determination section 137. The axis exchange processing section 160 does not assign the control right to another control unit until the axis stop of the system including the axis associated with the control right request is confirmed and the stop of the robot hand is confirmed.

If the axis exchange processing section 160 determines that the axis associated with the control right request cannot be assigned based on the notifications from the axis stop determination section 155 and the machine operation completion determination section 137 (S220: No), the axis exchange processing section 160 writes a non-permission signal NG to the response signal field Ans of the axis associated with the control right request in the region A #1 of the shared area 125 (S240).

If the axis exchange processing section 160 determines that the axis associated with the control right request can be assigned (S220: Yes), the axis exchange processing section 160 writes a permission signal OK to the response signal field Ans of the axis associated with the control right request in the region A #1 of the shared area 125 (S230). The axis exchange processing section 160 notifies the axis exchange analysis section 141 that the control right request has been permitted. After that, the position command PI for the axis associated with the control right request is transmitted from the control unit that has transmitted the control right request. Then, the axis exchange analysis section 141 acquires this position command via the shared area 125, and passes the acquired position command to the interpolation processing section. Consequently, based on the position command PI given by another control unit #2 or #3, the axis whose control right has been transferred to another control unit #2 or #3, that is, the axis connected to the control unit #1, is driven and controlled (S250). In addition, the interpolation processing section 150 sequentially sets FB signals in the FB signal field of the axis associated with the control right request, that is, the axis whose control right has been transferred to another control unit #2 or #3, in the region A #1 of the shared area 125 (S260).

In the above description, the position commands analyzed by the analysis processing sections 140, 240, and 340 are written to the position command fields of the shared areas 125, 225, and 325. Alternatively, interpolation processing results in the interpolation processing sections 150, 250, and 350 may be written to the position command fields of the shared areas 125, 225, and 325. Further, as described above, the position command PI for another control unit may be written to the shared area only during the period in which the own control unit has the control right, or all the position commands contained in the program analyzed by the own control unit may be written to the shared area. FB signals may be written to the shared area only when a real axis of the own control unit is driven based on a position command from another control unit, or FB signals may always be written to the shared area.

Figure 10:
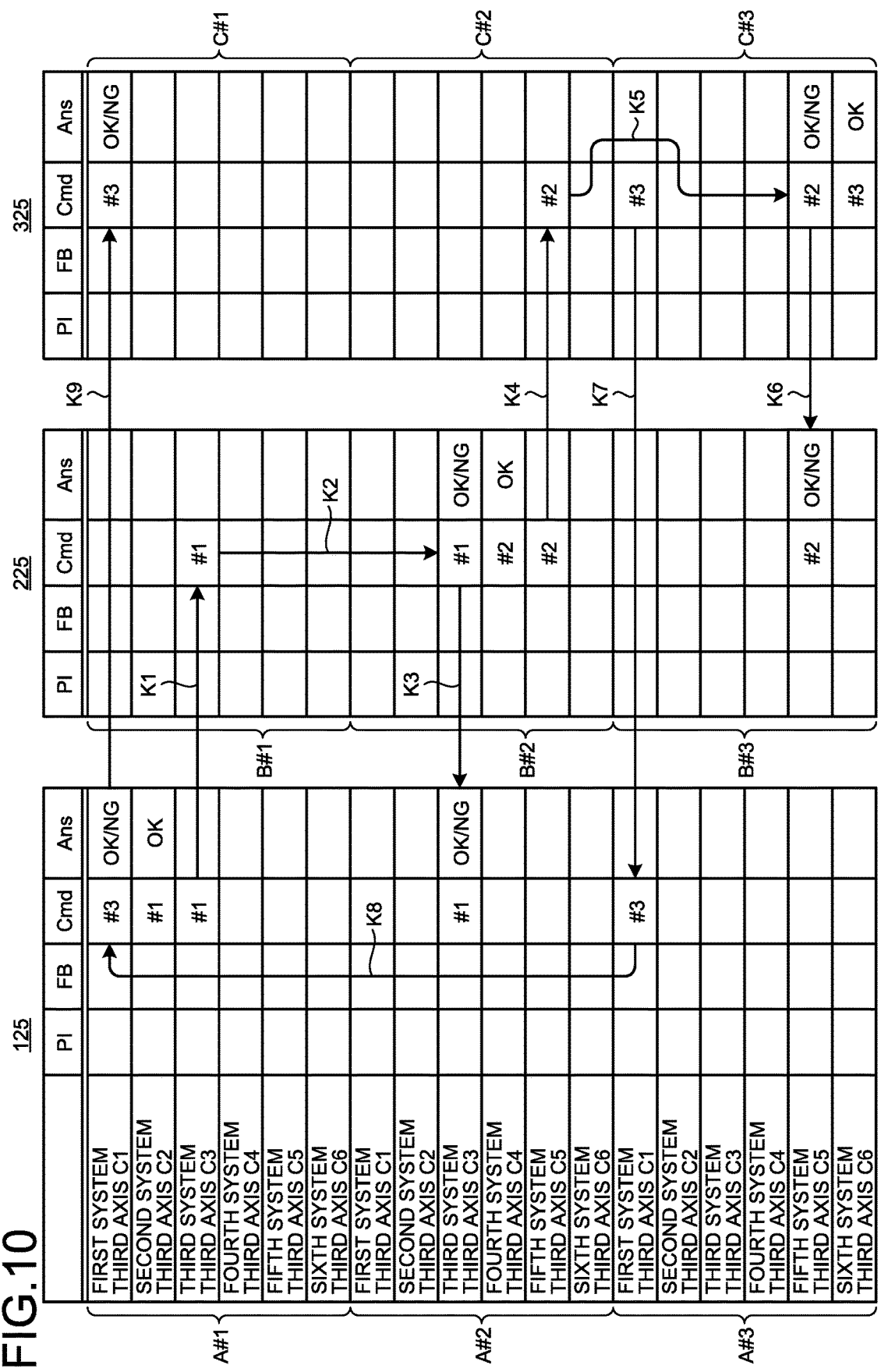
FIG. 10 is a diagram illustrating the state that the shared area of each control unit is in when the block N20 of the machining programs in FIG. 6 is executed.
Figure 11:
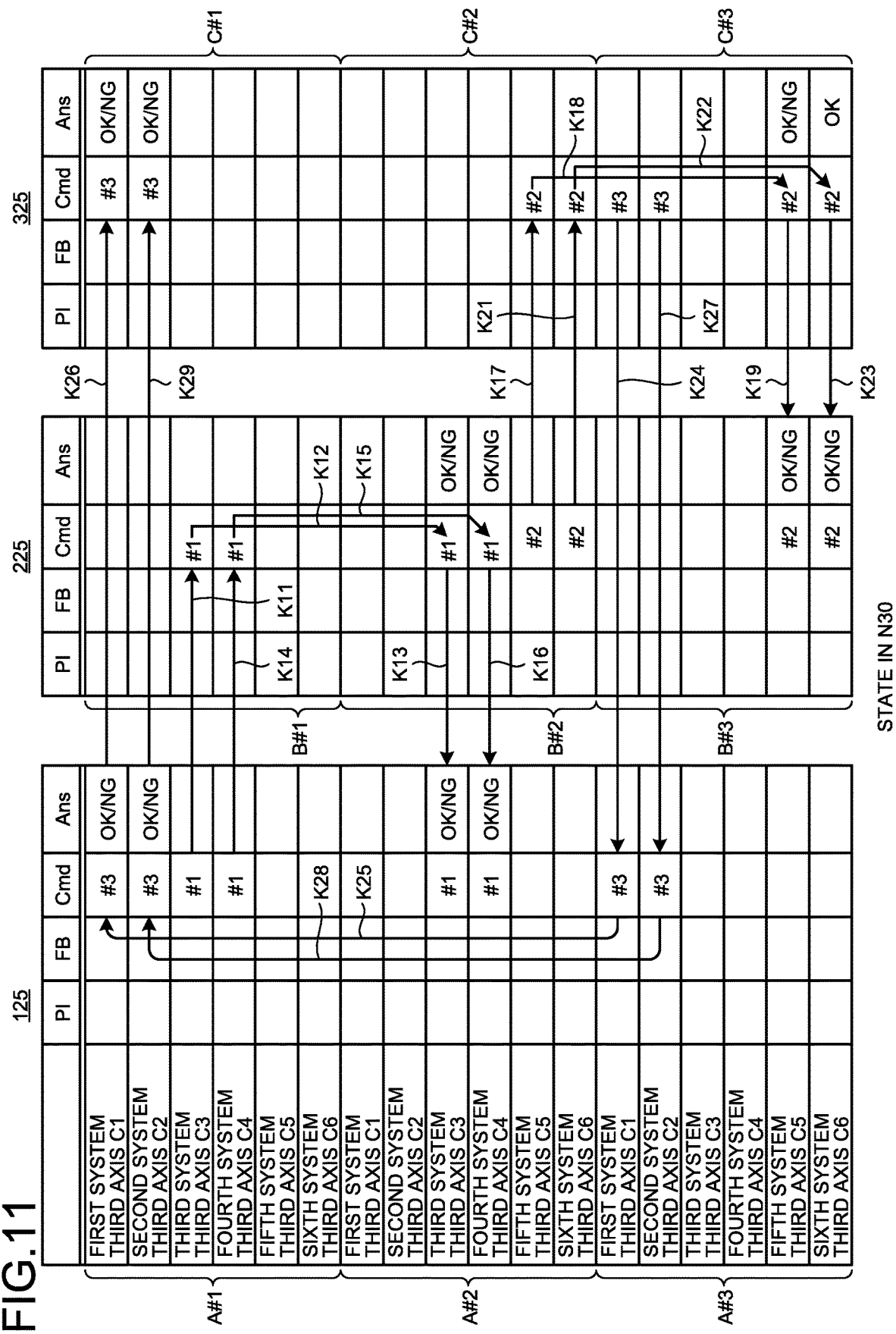
FIG. 11 is a diagram illustrating the state that the shared area of each control unit is in when the block N30 of the machining programs in FIG. 6 is executed.

Next, the operation of axis exchange that is performed when the machining programs illustrated in FIG. 6 are executed by the control units #1, #2, and #3 will be described with reference to FIGS. 9 to 11. In the processing machine 600 illustrated in FIG. 1, as described above, the NC axes (X and Z axes) are not exchanged, and only the spindles (C axes) are exchanged. For this reason, the following description refers mainly to the operation of C-axis exchange. FIG. 9 is a diagram illustrating the state that the shared areas 125, 225, and 325 are in when the block N10 is executed. FIG. 10 is a diagram illustrating the state that the shared areas 125, 225, and 325 are in when the block N20 is executed. FIG. 11 is a diagram illustrating the state that the shared areas 125, 225, and 325 are in when the block N30 is executed. In the drawings, only the state of the entries related to the C axes is extracted.

In the block N10 of the machining program #P1, the C1 axis is designated. Based on the axis definition illustrated in FIG. 3, the axis exchange analysis section 141 determines that the C1 axis designated by the axis exchange command G140 contained in the block N10 of the machining program #P1 is a real axis of the own control unit #1. Further, because this axis exchange command G140 is the first axis exchange command, the axis exchange analysis section 141 determines that the own control unit #1 can immediately acquire the control right for this C1 axis. The axis exchange analysis section 141 transmits this determination to the axis exchange processing section 160. The axis exchange processing section 160 sets a control right acquisition declaration for the C1 axis in the shared area 125. Specifically, the axis exchange processing section 160 writes the own control unit number "#1" to the command field Cmd of the C1 axis in the region A #1 of the shared area 125, and writes permission OK to the response signal field Ans of the C1 axis in the region A #1 (see FIG. 9). After that, the control unit #1 executes the block next to the block N10 of the machining program #P1.

Similar processing is executed for the block N10 of the machining program #P2. As a result, the axis exchange processing section 160 writes the own control unit number "#1" to the command field Cmd of the C2 axis in the region A #1 of the shared area 125, and writes permission OK to the response signal field Ans of the C2 axis in the region A #1 (see FIG. 9). After that, the control unit #1 executes the block next to the block N10 of the machining program #P2.

The control units #2 and #3 perform similar processing. As a result, as illustrated in FIG. 9, the control unit number "#2" is written to the command field Cmd of the C3 axis in the region B #2 of the shared area 225, and permission OK is written to the response signal field Ans of the C3 axis in the region B #2. Further, the control unit number "#2" is written to the command field Cmd of the C4 axis in the region B #2 of the shared area 225, and permission OK is written to the response signal field Ans of the C4 axis in the region B #2. Further, the control unit number "#3" is written to the command field Cmd of the C5 axis in the region C #3 of the shared area 325, and permission OK is written to the response signal field Ans of the C5 axis in the region C #3. Further, the control unit number "#3" is written to the command field Cmd of the C6 axis in the region C #3 of the shared area 325, and permission OK is written to the response signal field Ans of the C6 axis in the region C #3.

In the block N20 of the machining program #P1, the C2 axis is designated. Based on the axis definition illustrated in FIG. 3, the axis exchange analysis section 141 determines that the C2 axis designated by the axis exchange command G140 contained in the block N10 of the machining program #P1 is a real axis of the own control unit #1. If the axis exchange analysis section 141 determines that the control right for the C2 axis associated with the control right request can be acquired based on the notifications from the axis stop determination section 155 and the machine operation completion determination section 137, the axis exchange analysis section 141 writes the own control unit number "#1" to the command field Cmd of the C2 axis in the region A #1 of the shared area 125, and writes permission OK to the response signal field Ans of the C2 axis in the region A #1 (see FIG. 10). The analysis processing section 140 passes the analysis result of the block next to the block N20 to the interpolation processing section 150, thereby causing the next block to be executed.

In the block N20 of the machining program #P2, the C3 axis is designated. Based on the axis definition illustrated in FIG. 3, the axis exchange analysis section 141 determines that the C3 axis designated by the axis exchange command G140 contained in the block N20 of the machining program #P2 is a real axis of the control unit #2. The axis exchange analysis section 141 transmits this determination to the axis exchange processing section 160. The axis exchange processing section 160 writes the own control unit number "#1" to the command field Cmd of the C3 axis in the region A #1 of the shared area 125 (see FIG. 10). This written content is transferred from the shared area 125 of the control unit #1 to the shared area 225 of the control unit #2 and the shared area 325 of the control unit #3. The arrow K1 in FIG. 10 indicates data transfer from the control unit #1 to the control unit #2. In FIGS. 10 and 11, arrows indicating data transfer to control units that do not contribute to axis exchange are omitted for convenience.

The axis exchange processing section 260 of the control unit #2 executes control right assignment determination and writing of the permission signal OK or non-permission signal NG by following the procedure illustrated in FIG. 8. The axis exchange processing section 260 writes the control unit number "#1" to the command field Cmd of the C3 axis in the region B #2 of the shared area 225, and writes the permission signal OK or non-permission signal NG to the response signal field Ans of the C3 axis in the region B #2. The arrow K2 in FIG. 10 represents this writing process. This written content is transferred from the shared area 225 of the control unit #2 to the shared area 125 of the control unit #1 and the shared area 325 of the control unit #3. The arrow K3 in FIG. 10 indicates data transfer from the region B #2 of the control unit #2 to the region A #2 of the control unit #1.

The axis exchange processing section 160 of the control unit #1 determines whether the control right request for the C3 axis has been permitted based on the memory content in the region A #2 of the shared area 125. If the control right has been successfully acquired, the axis exchange processing section 160 notifies the analysis processing section 140 of the successful acquisition of the control right. The analysis processing section 140 analyzes the block next to the block N20 of the machining program #P2, and writes the position command as the analysis result to the position command field Pl of the C3 axis in the region A #1 of the shared area 125.

The block N20 of the machining program #P3 is executed by the control unit #2, whereby the control unit number "#2" is written to the command field Cmd of the C4 axis in the region B #2 of the shared area 225, and the permission signal OK is written to the response signal field Ans of the C4 axis in the region B #2, as illustrated in FIG. 10. The block N20 of the machining program #P4 is executed by the control unit #2, whereby the axis exchange process indicated by the arrows K4, K5, and K6 is performed.

The block N20 of the machining program #P5 is executed by the control unit #3, whereby the control unit number "#3" is written to the command field Cmd of the C6 axis in the region C #3 of the shared area 325, and permission OK is written to the response signal field Ans of the C6 axis in the region C #3, as illustrated in FIG. 10. The block N20 of the machining program #P6 is executed by the control unit #3, whereby the axis exchange process indicated by the arrows K7, K8, and K9 is performed.

In the block N30 of the machining program #P1, the C3 axis is designated. The axis exchange analysis section 141 determines that the C3 axis is a real axis of another control unit #2 based on the axis definition illustrated in FIG. 3. The axis exchange analysis section 141 transmits this determination to the axis exchange processing section 160. The axis exchange processing section 160 writes the own control unit number "#1" to the command field Cmd of the C3 axis in the region A #1 of the shared area 125 (see FIG. 11). This written content is transferred from the shared area 125 of the control unit #1 to the shared area 225 of the control unit #2 and the shared area 325 of the control unit #3. The arrow K11 in FIG. 11 indicates data transfer from the control unit #1 to the control unit #2. The axis exchange processing section 260 of the control unit #2 executes control right assignment determination by following the procedure illustrated in FIG. 8. The axis exchange processing section 260 writes the control unit number "#1" to the command field Cmd of the C3 axis in the region B #2 of the shared area 225, and writes the permission signal OK or non-permission signal NG to the response signal field Ans of the C3 axis in the region B #2.

The arrow K12 in FIG. 11 represents this writing process. This written content is transferred from the shared area 225 of the control unit #2 to the shared area 125 of the control unit #1 and the shared area 325 of the control unit #3. The arrow K13 in FIG. 11 indicates data transfer from the region B #2 of the control unit #2 to the region A #2 of the control unit #1. The axis exchange processing section 160 of the control unit #1 determines whether the control right request for the C3 axis has been permitted based on the memory content in the region A #2 of the shared area 125. If the control right has been successfully acquired, the axis exchange processing section 160 notifies the analysis processing section 140 of the successful acquisition of the control right. The analysis processing section 140 analyzes the block next to the block N30 of the machining program #P1, and writes the position command as the analysis result to the position command field PI of the C3 axis in the region A #1 of the shared area 125.

Similarly, the block N30 of the machining program #P2 is executed by the control unit #1, whereby the axis exchange process indicated by the arrows K14, K15, and K16 is performed. The block N30 of the machining program #P3 is executed by the control unit #2, whereby the axis exchange process indicated by the arrows K17, K18, and K19 is performed. The block N30 of the machining program #P4 is executed by the control unit #2, whereby the axis exchange process indicated by the arrows K21, K22, and K23 is performed. The block N30 of the machining program #P5 is executed by the control unit #3, whereby the axis exchange process indicated by the arrows K24, K25, and K26 is performed. The block N30 of the machining program #P6 is executed by the control unit #3, whereby the axis exchange process indicated by the arrows K27, K28, and K29 is performed.

Figure 12:
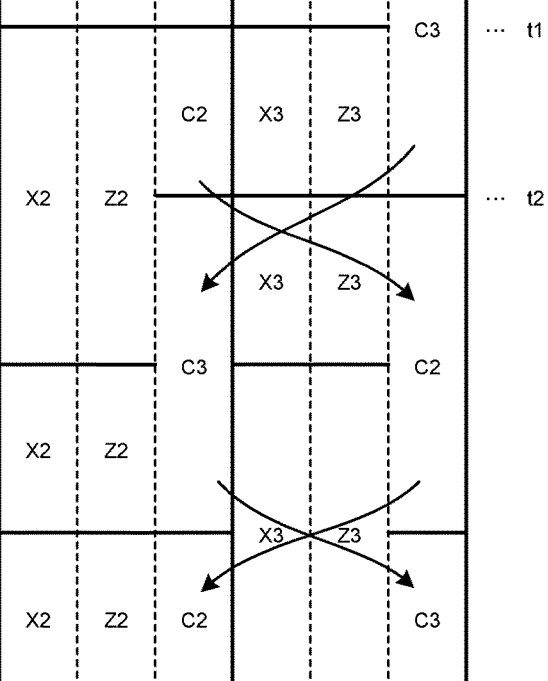
FIG. 12 is a conceptual diagram for explaining timings of control right transfer for axis exchange according to the first embodiment.

FIG. 12 is a diagram for explaining timings of control right transfer for axis exchange. The machining program #P2 executed in the second system of the control unit #1 and the machining program #P3 executed in the first system of the control unit #2 are illustrated. The machining program #P2 contains the axis exchange command G140 designating the C2 axis in the block N100, the axis exchange command G140 designating the C3 axis in the block N110, and the axis exchange command G140 designating the C2 axis in the block N120. The machining program #P3 contains the axis exchange command G140 designating the C3 axis in the block N100, the axis exchange command G140 designating the C2 axis in the block N110, and the axis exchange command G140 designating the C3 axis in the block N120.

Suppose that the control unit #1 executes the block N100 of the machining program #P2 and acquires the control right for the X2, Z2, and C2 axes. The control unit #1 then executes blocks subsequent to the block N100 of the machining program #P2 and executes machining using the X2, Z2, and C2 axes. Similarly, suppose that the control unit #2 executes the block N100 of the machining program #P3 and acquires the control right for the X3, Z3, and C3 axes. The control unit #2 then executes blocks subsequent to the block N100 of the machining program #P3 and executes machining using the X3, Z3, and C3 axes.

Suppose that the machining at the control unit #1 that involves the use of the X2, Z2, and C2 axes is completed at time t1. Then, suppose that the machining at the control unit #2 that involves the X3, Z3, and C3 axes is not completed by time t1. The control unit #1 executes the block N110 of the machining program #P2 and requests the control right for the C3 axis from the other control unit. The control unit #2 receives the control right request for the C3 axis from the control unit #1, but returns the non-permission signal NG to the control unit #1 until time t2 when the machining that involves the use of the X3, Z3, and C3 axes is completed. By receiving the non-permission signal NG, the control unit #1 waits to acquire the control right for the C3 axis during the period from time t1 to time t2.

The machining at the control unit #2 that involves the use of the X3, Z3, and C3 axes is completed at time t2. Then, the control unit #2 returns a C3-axis permission signal OK to the control unit #1. The control unit #1 acquires the control right for the C3 axis upon receipt of the permission signal OK. The control unit #1 executes blocks subsequent to the block N110 of the machining program #P2, and transfers the C3-axis position command PI to the control unit #2 via the shared area 125.

At time t2, the machining at the control unit #2 that involves the use of the X3, Z3, and C3 axes is completed. Then, the control unit #2 executes the block N110 of the machining program #P3, and requests the control right for the C2 axis from the other control unit. The control unit #1 detects the control right request for the C2 axis from the control unit #2, and returns a C2-axis permission signal OK to the control unit #2. The control unit #2 acquires the control right for the C2 axis upon receipt of the permission signal OK. The control unit #2 executes blocks subsequent to the block N110 of the machining program #P3 and transfers the C2-axis position command PI to the control unit #1 via the shared area 225.

The control unit #1 drives and controls the X2 and Z2 axes based on the content of blocks subsequent to the block N110 of the machining program #P2, and drives and controls the C2 axis based on the position command PI transferred from the control unit #2 via the shared area. The control unit #2 drives and controls the X3 and Z3 axes based on the content of blocks subsequent to the block N110 of the machining program #P3, and drives and controls the C3 axis based on the position command PI transferred from the control unit #1 via the shared area.

In the numerical control device of FIG. 1, two systems are connected to one control unit. Alternatively, one system may be connected to one control unit, or three or more systems may be connected to one control unit. In the above description, only the spindles (C axes) are exchanged between the control units. Alternatively, the NC axes may be subjected to axis exchange.

As described above, in the first embodiment, the transmission and reception of control right requests and response signals for axis exchange are performed using the shared area of each control unit, which enables axis exchange control that is simple and provides a high degree of freedom in changing the machine configuration (changing an axis to be exchanged, adding a system, and the like) or changing the control configuration (adding a control unit and the like). In addition, changing an axis to be exchanged, adding a system, adding a control unit, and the like can be achieved simply by adding entries to the shared areas 125, 225, and 325 of the control units #1, #2, and #3, which enables axis exchange control with a high degree of freedom. In addition, each shared area includes entries to which information on the axes included in all the systems of the processing machine is written, and control right requests and response signals are written to corresponding axis entries, which enables axis exchange without using control right request signals in a complicated format. In addition, using a simple setting procedure, axis exchange can be implemented in a numerical control device including three or more control units.

Second Embodiment

The processing machine 600 illustrated in FIG. 1, the numerical control device 1000 illustrated in FIG. 2, the axis definition illustrated in FIG. 3, and the shared areas illustrated in FIGS. 4 and 5 are also applied to the second embodiment. In the second embodiment, a command for axis exchange between control units is given using an M code which is one of auxiliary commands. In FIG. 2, in a case where the machining program 122 contains an M code, the analysis processing section 140 passes the M code in the machining program to the auxiliary command axis exchange analysis section 138. The auxiliary command axis exchange analysis section 138 passes the received M code to the PLC 135. The PLC 135 stores an M code table indicating the correspondence between M codes and command contents. The PLC 135 acquires the command content corresponding to the M code using the M code table, and passes the acquired command content to the auxiliary command axis exchange analysis section 138. The auxiliary command axis exchange analysis section 138 analyzes the command content and passes the analysis result to the analysis processing section 140 via the work area 124.

Figure 13:
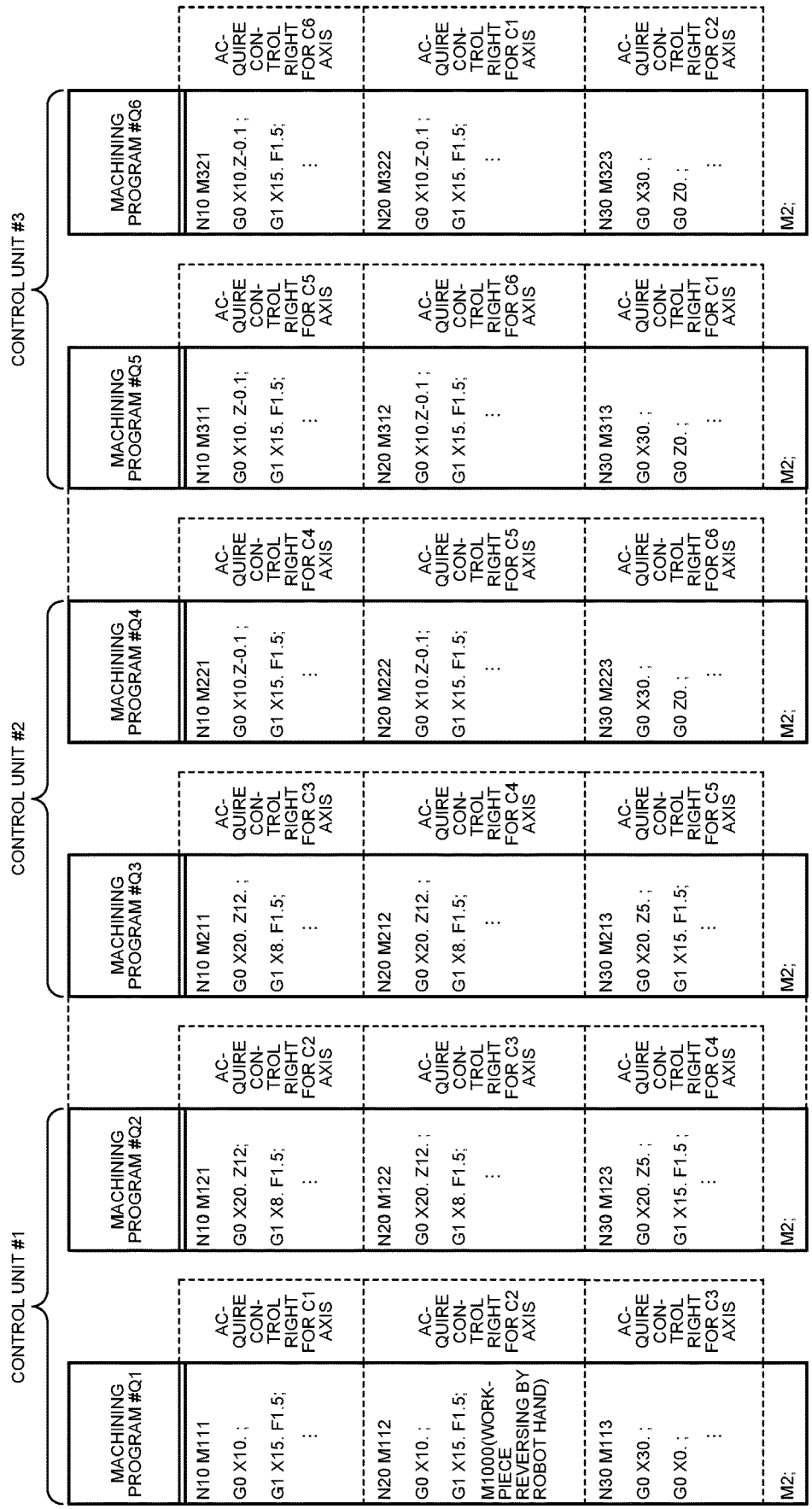
FIG. 13 is a diagram illustrating examples of machining programs applied to a second embodiment.

FIG. 13 is a diagram illustrating examples of machining programs applied to the second embodiment. Machining programs #Q1 and #Q2 correspond to the machining program 122 and are executed in parallel by the control unit #1. Machining programs #Q3 and #Q4 correspond to the machining program 222 and are executed in parallel by the control unit #2. Machining programs #Q5 and #Q6 correspond to the machining program 322 and are executed in parallel by the control unit #3.

In the blocks N10, N20, and N30 of the machining programs #Q1 to #Q6, axis exchange commands are described using M codes. For example, "M111" is described in the block N10 of the machining program #Q1, "M121" is described in the block N10 of the machining program #Q2, "M211" is described in the block N10 of the machining program #Q3, "M221" is described in the block N10 of the machining program #Q4, "M311" is described in the block N10 of the machining program #Q5, and "M321" is described in the block N10 of the machining program #Q6.

FIG. 14 is a diagram illustrating an example of the M code table stored in the built-in memory of the PLC 135. In FIG. 14, the control unit number indicates the control unit that executes the M code, and the system number indicates the system number in the control unit that executes the M code. "$1" indicates the first system, and "$2" indicates the second system. M111 indicates the axis configuration in which the first axis is the X1 axis and the third axis is the C1 axis, and indicates that the first system $1 of the control unit #1 is the control entity. M121 indicates the axis configuration in which the first axis is the X2 axis, the second axis is the Z2 axis, and the third axis is the C2 axis, and indicates that the second system $2 of the control unit #1 is the control entity. M211 indicates the axis configuration in which the first axis is the X3 axis, the second axis is the Z3 axis, and the third axis is the C3 axis, and indicates that the first system $1 of the control unit #2 is the control entity. M221 indicates the axis configuration in which the first axis is the X4 axis, the second axis is the Z4 axis, and the third axis is the C4 axis, and indicates that the second system $2 of the control unit #2 is the control entity. M311 indicates the axis configuration in which the first axis is the X5 axis, the second axis is the Z5 axis, and the third axis is the C5 axis, and indicates that the first system $1 of the control unit #3 is the control entity. M321 indicates the axis configuration in which the first axis is the X6 axis, the second axis is the Z6 axis, and the third axis is the C6 axis, and indicates that the second system $2 of the control unit #3 is the control entity.

As an example, the operation that is performed when the block N20 of the machining program #Q2 is executed will be described. The analysis processing section 140 of the control unit #1 passes the M code M122 of the block N20 to the auxiliary command axis exchange analysis section 138. The auxiliary command axis exchange analysis section 138 passes the received M code M122 to the PLC 135. The PLC 135 acquires the command content corresponding to the M code M122 based on the M code table illustrated in FIG. 14, and passes the acquired command content to the auxiliary command axis exchange analysis section 138. The auxiliary command axis exchange analysis section 138 analyzes the command content. Through this analysis, the auxiliary command axis exchange analysis section 138 recognizes that M122 indicates the axis configuration in which the first axis is the X2 axis, the second axis is the Z2 axis, and the third axis is the C3 axis, and that the control entity is the second system $2 of the control unit #1. The auxiliary command axis exchange analysis section 138 passes the analysis result to the axis exchange processing section 160 via the work area 124.

The axis exchange processing section 160 operates in the same manner as in the first embodiment. Specifically, the axis exchange processing section 160 writes the own control unit number "#1" to the command field Cmd of the C3 axis in the region A #1 of the shared area 125, and requests the control right for the C3 axis from the control unit #2. After that, if the control right has been successfully acquired, the axis exchange processing section 160 notifies the sequence program of the completion of the control right acquisition via the machine control signal processing section 136 and the PLC 135. Further, the axis exchange processing section 160 notifies the analysis processing section 140 of the successful acquisition of the control right. The analysis processing section 140 analyzes the block next to the block N20 of the machining program #Q2, and writes the position command as the analysis result to the position command field PI of the C3 axis in the region A #1 of the shared area 125.

As described above, according to the second embodiment, the transmission and reception of control right requests and response signals for axis exchange are performed using the shared area of each control unit, which enables axis exchange control that is simple and provides a high degree of freedom, as in the first embodiment. In addition, because M codes are used for axis exchange, combinations of control units and systems can be easily changed.

Third Embodiment

Figure 15:
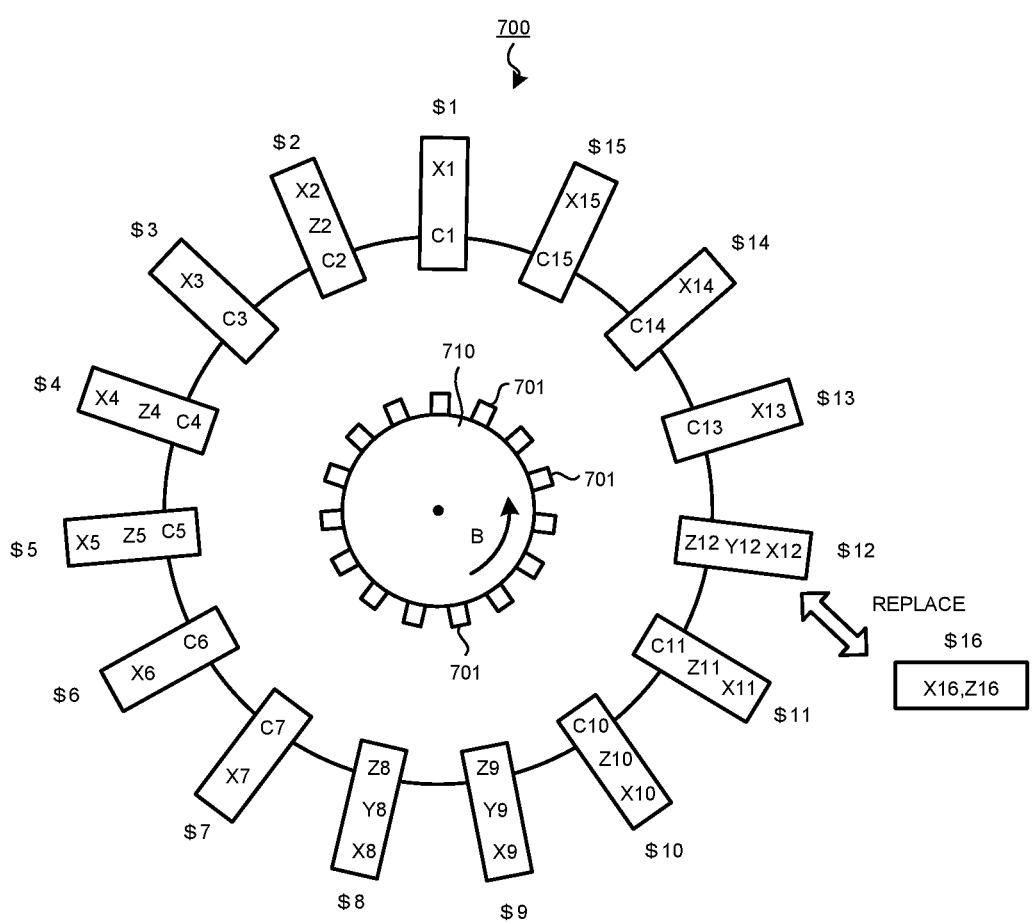
FIG. 15 is a conceptual diagram illustrating a processing machine that is driven by a numerical control device according to a third embodiment.

Next, the third embodiment will be described with reference to FIGS. 15 to 18. FIG. 15 is a diagram illustrating a processing machine 700 that is controlled by a numerical control device according to the third embodiment. This processing machine 700 is a multi-station machine and has the function of machining unit automatic replacement. The processing machine 700 includes a work drum 710 and fifteen machining units $1 to $15 arranged around the work drum 710. On the outer periphery of the work drum 710, fifteen workpiece supports 701 are arranged. Each workpiece support 701 supports a workpiece. Therefore, fifteen workpieces can be arranged on the work drum 710. Each of the machining units $1 to $15 executes machining on the workpiece gripped by the facing workpiece support 701. The work drum 710 rotates in the B direction. As the work drum 710 rotates, the workpiece moves to the position facing the next machining unit. Each workpiece is machined by the machining units $1 to $15, which is the end of the machining operation.

The machining unit $1 includes an X1 axis and a C1 axis. The machining unit $2 includes an X2 axis, a Z2 axis, and a C2 axis. The machining unit $3 includes an X3 axis and a C3 axis. The machining unit $4 includes an X4 axis, a Z4 axis, and a C4 axis. The machining unit $5 includes an X5 axis, a Z5 axis, and a C5 axis. The machining unit $6 includes an X6 axis and a C6 axis. The machining unit $7 includes an X7 axis and a C7 axis. The machining unit $8 includes an X8 axis, a Y8 axis, and a Z8 axis. The machining unit $9 includes an X9 axis, a Y9 axis, and a Z9 axis. The machining unit $10 includes an X10 axis, a Z10 axis, and a C10 axis. The machining unit $11 includes an X11 axis, a Z11 axis, and a C11 axis. The machining unit $12 includes an X12 axis, a Y12 axis, and a Z12 axis. The machining unit $13 includes an X13 axis and a C13 axis. The machining unit $14 includes an X14 axis and a C14 axis. The machining unit $15 includes an X15 axis and a C15 axis. The machining unit $16 can be used in place of the machining unit $12 and includes an X16 axis and a Z16 axis.

The configuration of the numerical control device 1000 illustrated in FIG. 2 is also applied to the third embodiment. However, the drive sections 180, 280, and 380 illustrated in FIG. 2 are replaced with the drive sections of the processing machine 700 illustrated in FIG. 15. The processing machine 700 illustrated in FIG. 15 includes the fifteen machining units (systems) $1 to $15, and machines one workpiece in fifteen steps. After steps 1 to 11 (systems $1 to $11) are executed, for example, drilling is performed in step 12 (system $12), and then steps 13 to 15 (systems $13 to $15) are executed, which is the end of the machining operation.

In order to finish the workpiece, it is necessary to add, for example, turning. In the third embodiment, turning is added by using the processing machine's function of machining unit automatic replacement. For example, after drilling in step 12 is completed by the machining unit $12, the machining unit $12, which is a drilling unit, is replaced with the turning unit $16, and turning is performed by the turning unit $16. After turning, the turning unit $16 is replaced with the machining unit $12. After that, steps 13 to 15 (systems $13 to $15) are executed on the turned workpiece, and the machining is completed.

FIG. 16 is a diagram illustrating the axis definition for the three control units #1, #2, and #3 of the numerical control device 1000. According to the axis definition in FIG. 16, the control unit #1 drives and controls the machining unit $1 that executes step 1, the machining unit $2 that executes step 2, the machining unit $3 that executes step 3, the machining unit $4 that executes step 4, the machining unit $5 that executes step 5, and the machining unit $16 that executes an additional turning step.

According to the axis definition in FIG. 16, the control unit #2 drives and controls the machining unit $6 that executes step 6, the machining unit $7 that executes step 7, the machining unit $8 that executes step 8, the machining unit $9 that executes step 9, the machining unit $10 that executes step 10, and a machining unit $17 that executes a five-axis machining step. The machining unit $17 will be described in the fourth embodiment.

According to the axis definition in FIG. 16, the control unit #3 drives and controls the machining unit $11 that executes step 11, the machining unit $12 that executes step 12, the machining unit $13 that executes step 13, the machining unit $14 that executes step 14, and the machining unit $15 that executes step 15.

Figure 18:
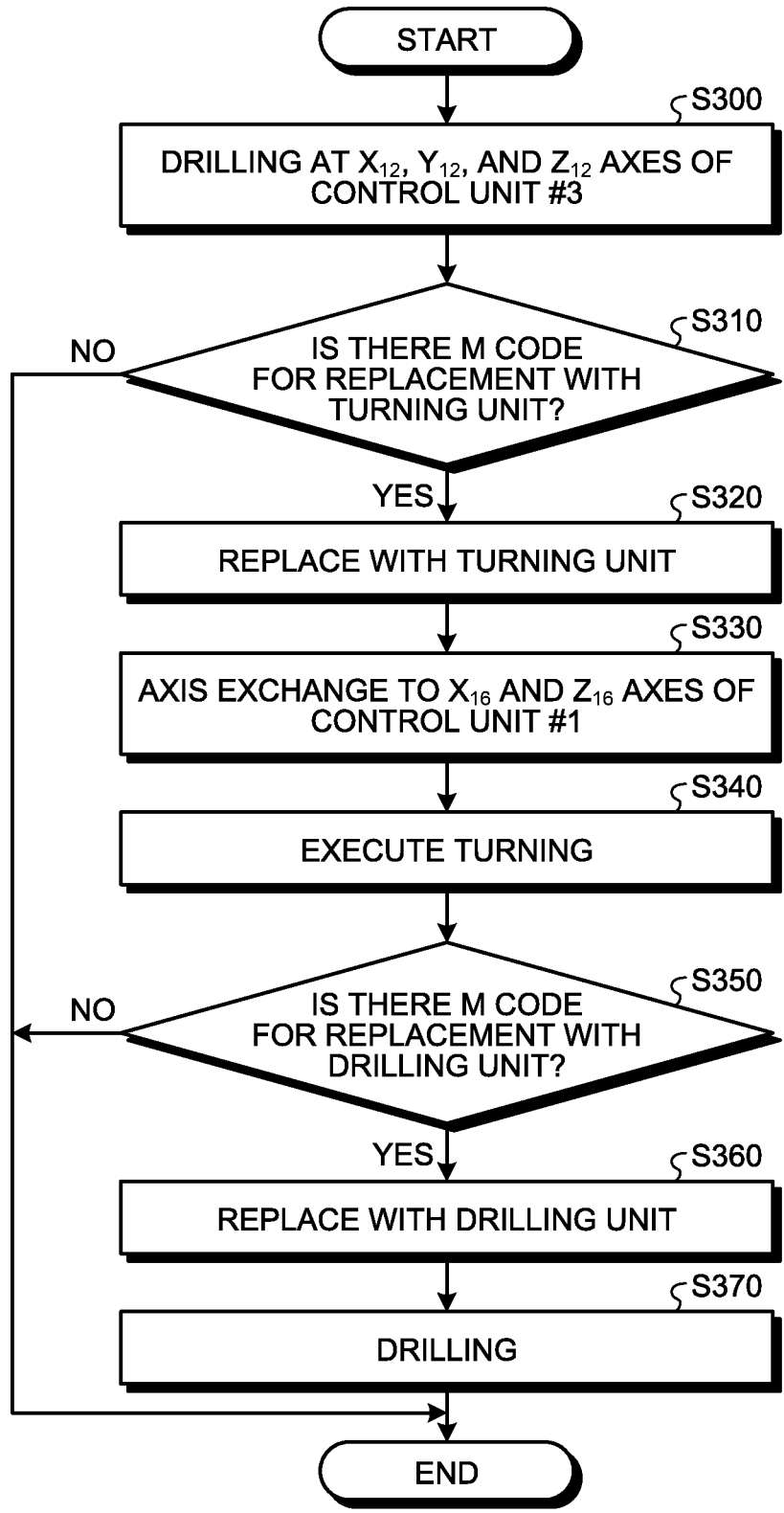
FIG. 18 is a flowchart illustrating an exemplary operation for machining unit replacement according to the third embodiment.

FIG. 17 is a diagram illustrating an example of a machining program executed by the second system of the control unit #3. This machining program contains the above-mentioned process of replacing the machining unit for drilling with the machining unit for turning. FIG. 18 is a flowchart illustrating the procedure for replacing the machining unit for drilling with the machining unit for turning. Hereinafter, the operation will be described with reference to FIGS. 17 and 18.

In the block N50 of the machining program in FIG. 17, "G140 X=X12 Y=Y12 Z=Z12" is described. The control unit #3 drives and controls the X12, Y12, and Z12 axes of the machining unit $12 by executing blocks subsequent to N50, and executes drilling on the workpiece (S300 in FIG. 18). After the drilling is completed, the control unit #3 determines whether the M code M100 indicating a switch from drilling to turning is described in the machining program (S310). In a case where the machining program contains M100, the sequence program is notified of the M code M100 via the PLC. Processing by the sequence program causes the machining unit $12 to be automatically replaced with the machining unit $16, which is a turning unit (S320). M100 is described in the block N60 of the machining program in FIG. 17. In the block next to N60, "G140 X=X16 Z=Z16" is described as an axis exchange command. As illustrated in FIG. 16, the X16 axis and the Z16 axis designated by G140 are control axes of the control unit #1. Therefore, the control unit #3 executes the same processing as in the first embodiment after completing the replacement of the machining unit by M100, thereby transmitting a control right request for the X16 axis and the Z16 axis to the control unit #1 via the shared area 325. In response to receiving the permission signal OK for the control right request for the X16 axis and the Z16 axis from the control unit #1 via the shared area 325, the control unit #3 analyzes blocks subsequent to the block describing "G140 X=X16 Z=Z16", and transmits the position command PI as the analysis result to the control unit #1 via the shared area 325. The control unit #1 drives and controls the X16 axis and the Z16 axis of the machining unit $16 based on the position command PI received via the shared area 125, and executes turning. In this way, the axis exchange from the control unit #3 to the control unit #1 is performed (S330), and turning is executed (S340).

After the drilling is completed, the control unit #3 determines whether the M code M101 indicating a switch from turning to drilling is described in the machining program (S350). In a case where the machining program contains M101, the sequence program is notified of the M code M101 via the PLC. Processing by the sequence program causes the machining unit $16 to be automatically replaced with the original machining unit $12 (S360).

M101 is described in the block N70 of the machining program in FIG. 17. In the block next to N70, "G140 X=X12 Y=Y12 Z=Z12" is described as an axis exchange command. The control unit #3 analyzes blocks subsequent to the block describing "G140 X=X12 Y=Y12 Z=Z12" after completing the replacement of the machining unit by M101, and drives and controls the X12, Y12, and Z12 axes of the machining unit $12 based on the analysis result. With this drive control, drilling is executed on the next workpiece (S370). In this way, the replacement of the machining unit is performed and, for example, turning is added to a series of steps.

As described above, according to the third embodiment, axes are exchanged between the control units after the replacement of the machining unit. Thus, a series of machining operations can be continuously performed without stopping the machine.

Fourth Embodiment

Figure 19:
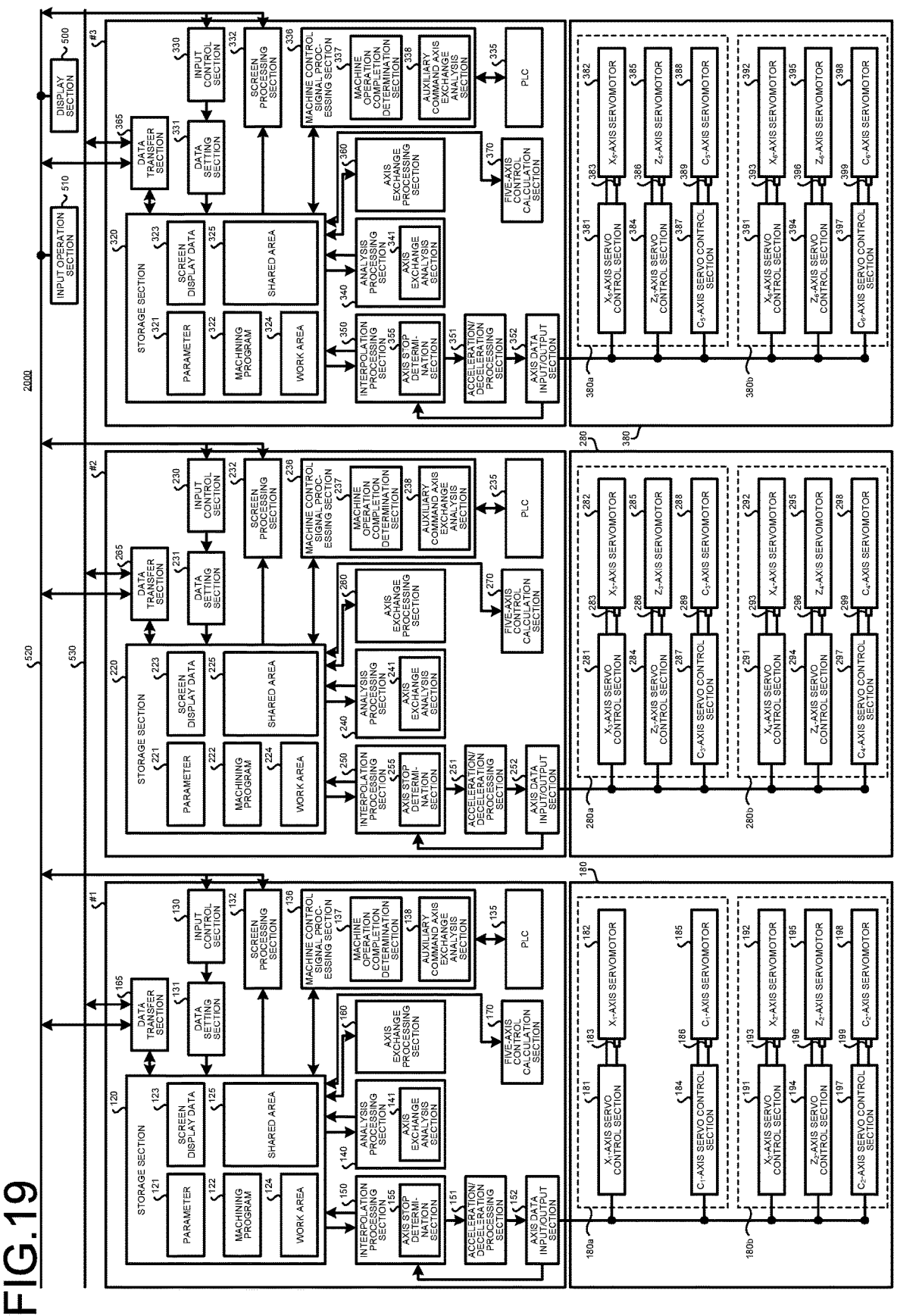
FIG. 19 is a block diagram illustrating an example of the internal configuration of a numerical control device according to the fourth embodiment.

FIG. 19 is a diagram illustrating a numerical control device 2000 according to the fourth embodiment. The numerical control device 2000 includes the control units #1, #2, and #3. The control units #1, #2, and #3 additionally include five-axis control calculation sections 170, 270, and 370, respectively. The five-axis control calculation section 170 performs X-, Y-, Z-, A-, and B-axis coordinate conversion calculation based on the analysis result of the machining program acquired from the analysis processing section 140, and passes the coordinate conversion result to the interpolation processing section 150 via the work area 124.

Figure 20:
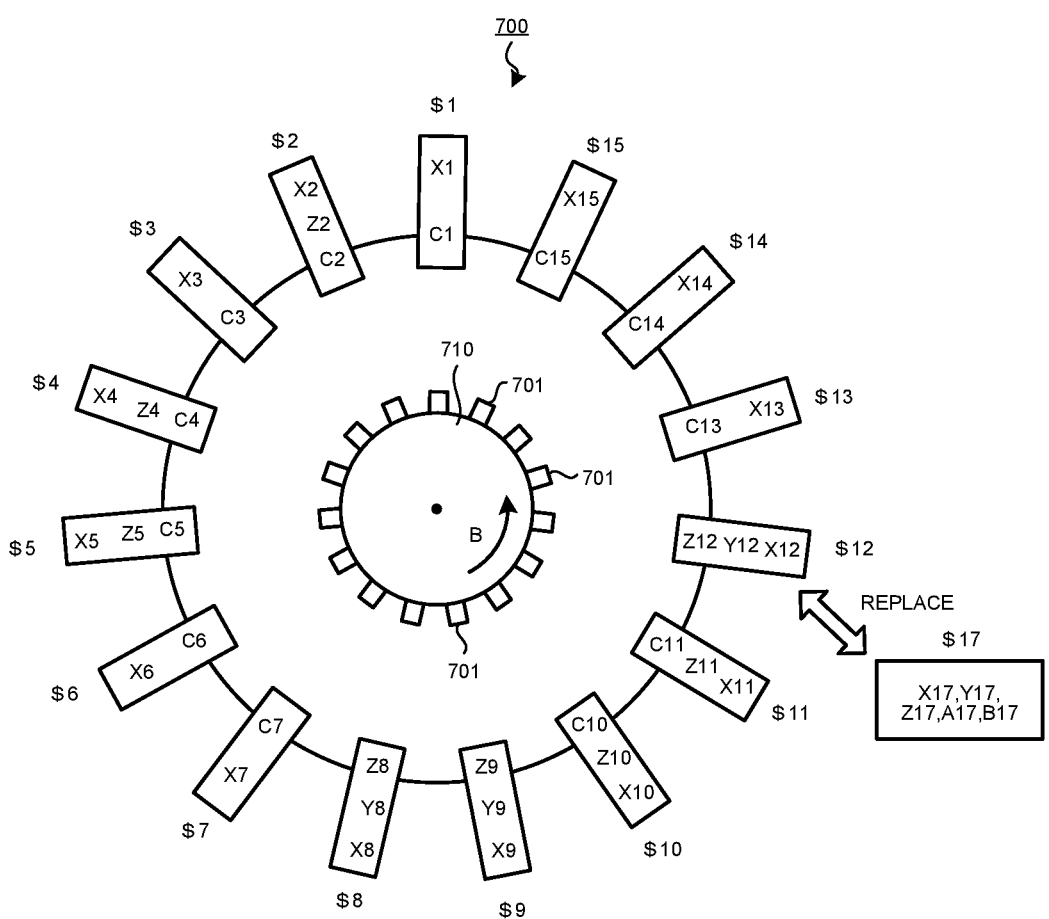
FIG. 20 is a conceptual diagram illustrating a processing machine that is driven by the numerical control device according to the fourth embodiment.

FIG. 20 is a diagram illustrating the processing machine 700 that is controlled by the numerical control device 2000 according to the fourth embodiment. The processing machine 700 is a multi-station machine similar to that of the third embodiment, and has the function of machining unit automatic replacement. In the processing machine 700 illustrated in FIG. 20, the machining unit $12 can be replaced with the machining unit $17. The machining unit $17 includes an X17 axis, a Y17 axis, a Z17 axis, an A17 axis, and a B17 axis, and performs five-axis machining.

FIG. 16 mentioned above is also applied to the axis definition for the numerical control device 2000 of the fourth embodiment. The machining unit $17 that performs five-axis machining is defined as real axes of the control unit #2.

FIG. 21 is a diagram illustrating an example of a machining program executed by the second system of the control unit #3. This machining program includes the process of replacing the machining unit $12 with the machining unit $17, which is a five-axis machining unit. In the block N200 of the machining program in FIG. 21, "G140 X=X12 Y=Y12 Z=Z12" is described. The control unit #3 drives and controls the X12, Y12, and Z12 axes of the machining unit $12 by executing blocks subsequent to N200, and executes drilling on the workpiece, for example.

M100 is described in the block N210 of the machining program in FIG. 21. This M100 causes the machining unit $12 to be automatically replaced with the machining unit $17 in the aforementioned manner. In the block next to N210, "G140 X=X17 Y=Y17 Z=Z17 A=A17 B=B17" is described as an axis exchange command. As illustrated in FIG. 16, the X17, Y17, Z17, A17, and B17 axes designated by G140 are driven by the control unit #2. Therefore, the control unit #3 performs the same processing as in the first embodiment after completing the replacement of the machining unit by M100 (replacement of the machining unit $12 with the machining unit $17), thereby transmitting a control right request for the X17, Y17, Z17, A17, and B17 axes to the control unit #2 via the shared area 325. In response to receiving the permission signal OK for the control right request for the X17, Y17, Z17, A17, and B17 axes from the control unit #2 via the shared area 325, the control unit #3 analyzes blocks subsequent to the block describing "G140 X=X17 Y=Y17 Z=Z17 A=A17 B=B17", and transmits the position command PI as the analysis result to the control unit #2 via the shared area 325. The control unit #2 passes the position command PI received via the shared area 225 to the five-axis control calculation section 270 via the analysis processing section 240. The five-axis control calculation section 270 performs five-axis coordinate conversion calculation and passes the calculation result to the interpolation processing section 250 via the work area 224. Consequently, the X17, Y17, Z17, A17, and B17 axes of the machining unit $17 are driven and controlled to execute five-axis machining.

M101 is described in the block N220 of the machining program in FIG. 21. In the block next to N220, "G140 X=X12 Y=Y12 Z=Z12" is described as an axis exchange command. The control unit #3 analyzes blocks subsequent to the block describing "G140 X=X12 Y=Y12 Z=Z12" after completing the replacement of the machining unit by M101 (replacement of the machining unit $17 with the machining unit $12), and drives and controls the X12, Y12, and Z12 axes of the machining unit $12 based on the analysis result. With this drive control, machining is executed on the next workpiece. In this way, the replacement of the machining unit is performed and, for example, five-axis machining is added to a series of steps.

The five-axis calculation processing in the five-axis control calculation sections 170, 270, and 370 requires more calculation time than other machining operations. In addition, the five-axis calculation processing can cause a situation in which one control unit has a higher processing load than another control unit. For example, when the control unit #1 and the control unit #2 are connected to five systems and the control unit #3 is connected to one system, the control unit #1 and the control unit #2 have higher processing loads than the control unit #3. In consideration of such a situation, a load confirmation field for confirming the load situation of each control unit may be provided in the shared area of each control unit.

The five-axis control calculation sections 170, 270, and 370 of the control units #1, #2, and #3 each check the processing load of the own control unit. If the processing load is low, five-axis coordinate conversion processing is performed by the five-axis control calculation section of the own control unit. Then, the coordinate conversion result is passed to the interpolation processing sections 150, 250, and 350 via the work areas 124, 224, and 334, and five-axis machining operation is performed.

In contrast, if the processing load of the own control unit is higher than a certain threshold value, the five-axis control calculation sections 170, 270, and 370 of the control units #1, #2, and #3 determine the load situation of the other control units by referring to the load confirmation field of the shared area. The five-axis control calculation sections 170, 270, and 370 of the control units #1, #2, and #3 identify the control unit with a lower processing load than the other units based on this determination. Then, the five-axis control calculation sections 170, 270, and 370 of the control units #1, #2, and #3 pass the five-axis calculation data to the control unit with a low processing load via the shared area. The five-axis control calculation section of the control unit that has received the five-axis calculation data via the shared area executes five-axis coordinate conversion processing, and returns the coordinate conversion result to the request source control unit via the shared area. The five-axis control calculation section of the request source control unit passes the received coordinate conversion result to the interpolation processing section via the work area, and performs five-axis machining operation.

As described above, according to the fourth embodiment, axes are exchanged between the control units after the replacement of the machining unit with the five-axis processing machine. Thus, a series of machining operations including the five-axis machining operation can be continuously performed without stopping the machine.

Fifth Embodiment

Figure 22:
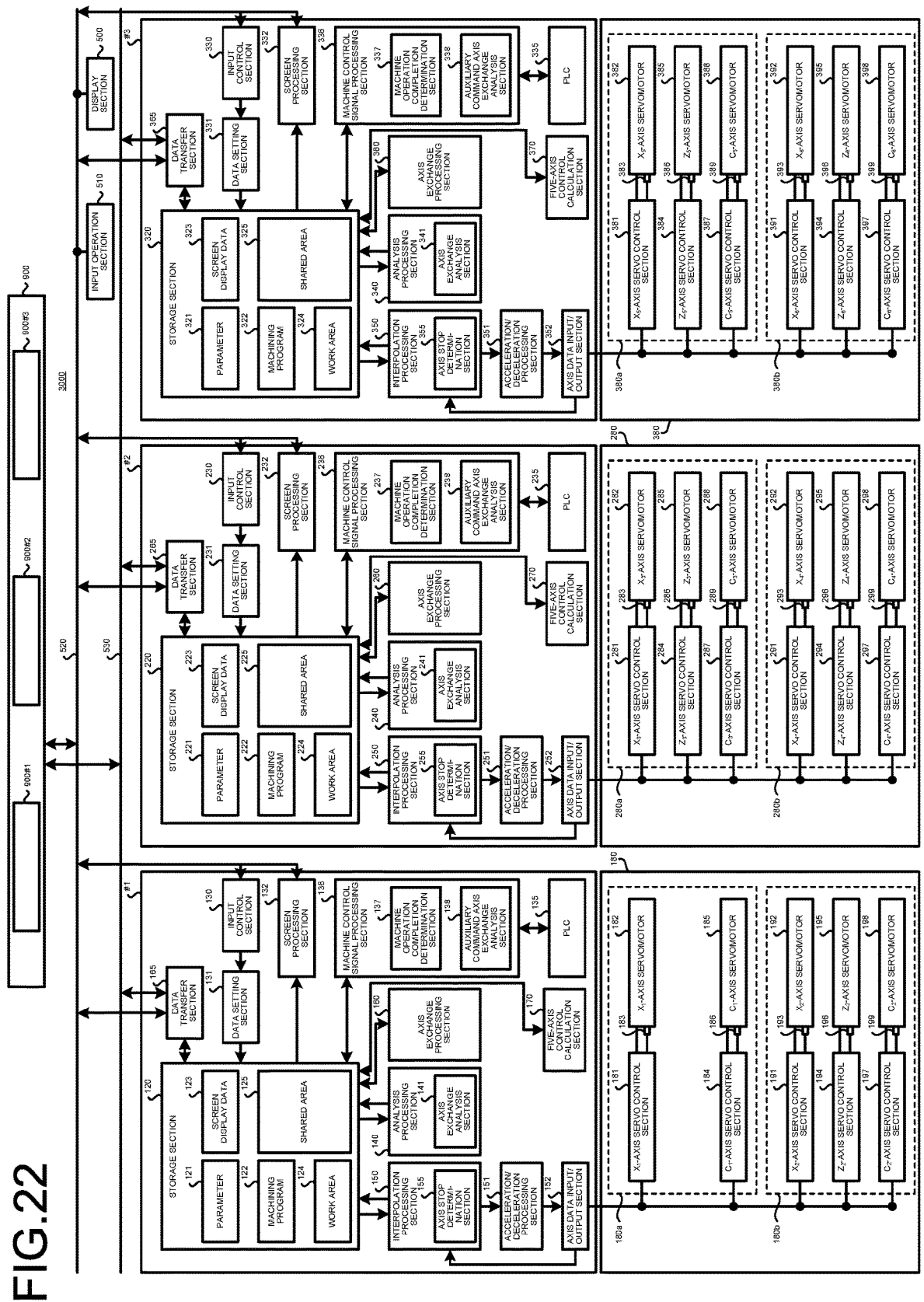
FIG. 22 is a block diagram illustrating an exemplary configuration of a numerical control device according to a fifth embodiment.

FIG. 22 is a diagram illustrating a numerical control device 3000 according to the fifth embodiment. In the numerical control device 3000 according to the fifth embodiment, a storage device 900 is provided outside the control units #1, #2, and #3. The storage device 900 is connected to the first communication path 520 or the second communication path 530, and functions as a shared area accessible by the control units #1, #2, and #3. In the fifth embodiment, the aforementioned exchange of control data for axis exchange is performed between the control units #1, #2, and #3 using the storage device 900. The control data stored in the storage device 900 include a control right request signal and a response signal for axis exchange as described above. The control data may also include a position command and a position feedback signal for controlling each axis. The shared areas 125, 225, and 325 in the control units #1, #2, and #3 are not used for exchanging control data for axis exchange, but are used for other purposes.

The storage device 900 includes, for example, three regions 900 #1, 900 #2, and 900 #3. The first region 900 #1 is a region to which the control unit #1 writes a control right request signal for each axis and the control unit #2 or #3 writes a response signal therefor. The second region 900 #2 is a region to which the control unit #2 writes a control right request signal for each axis and the control unit #1 or #3 writes a response signal therefor. The third region 900 #3 is a region to which the control unit #3 writes a control right request signal for each axis and the control unit #1 or #2 writes a response signal therefor. The control units #1, #2, and #3 regularly monitor whether data have been written to each of the regions 900 #1, 900 #2, and 900 #3.

After the control unit #1 acquires the control right for an axis, the control unit #1 may write a position command for this axis to the first region 900 #1. After the control unit #2 acquires the control right for an axis, the control unit #2 may write a position command for this axis to the second region 900 #2. After the control unit #3 acquires the control right for an axis, the control unit #3 may write a position command for this axis to the third region 900 #3. In addition, position feedback signals for the real axes (X1, C1, X2, Z2, and C2 axes) of the control unit #1 may be written to the first region 900 #1. Position feedback signals for the real axes (X3, Z3, C3, X4, Z4, and C4 axes) of the control unit #2 may be written to the second region 900 #2. Position feedback signals for the real axes (X5, Z5, C5, X6, Z6, and C6 axes) of the control unit #3 may be written to the third region 900 #3. The format of control data illustrated in FIG. 5 can be adopted as the memory form of the regions 900 #1, 900 #2, and 900 #3 simply by applying the first region 900 #1 to the region A #1, the second region 900 #2 to the region 13 #2, and the third region 900 #3 to the region C #3.

For example, when the control unit #1 requests the control right for the C3 axis, which is a real axis of the control unit #2, the control unit #1 writes a control right request signal for the C3 axis to the first region 900 #1. The control unit #2 detects the control right request signal for the C3 axis written to the first region 900 #1, and then determines the state of the C3 axis in the same manner as in the first embodiment. If the control unit #2 determines that the C3 axis associated with the control right request can be assigned, the control unit #2 writes a signal permitting the assignment of the C3 axis to the first region 900 #1. The control unit #1 recognizes the acquisition of the control right for the C3 axis based on the permission signal written to the first region 900 #1.

As described above, according to the fifth embodiment, the transmission and reception of control right requests and response signals for axis exchange are performed using the storage device 900 provided outside the control units, which enables axis exchange control that is simple and provides a high degree of freedom in changing the machine configuration or control configuration, as in the first embodiment. In addition, using a simple setting procedure, axis exchange can be implemented in a numerical control device including three or more control units.

Note that the format of storage data stored in the shared areas 125, 225, and 325 of the first to fourth embodiments or the format of storage data stored in the storage device 900 of the fifth embodiment is not limited to that illustrated in FIG. 5, and any other format may be adopted.

The fifth embodiment may be applied to the second to fourth embodiments described above. For example, suppose that the fifth embodiment is applied to the third embodiment. In this case, the control unit #3 transmits a control right request for the X16 and Z16 axes of the turning unit $16 to the control unit #1 via the storage device 900. The control unit #1 transmits a response signal for the control right request to the control unit #3 via the storage device 900.

In the first to fourth embodiments, the shared areas 125, 225, and 325 are provided inside the control units #1, #2, and #3. Alternatively, the shared areas 125, 225, and 325 may be provided outside the control units. In this case, as in the first to fourth embodiments, the shared areas 125, 225, and 325 are basically controlled to store the same control data, the shared area 125 is accessible only by the control unit #1, the shared area 225 is accessible only by the control unit #2, and the shared area 325 is accessible only by the control unit #3.

In the above-mentioned first to fifth embodiments, for example, when the control unit #1 controls an axis connected to another control unit #2 or #3, the position command is transmitted to the other control units. Alternatively, the interpolation processing result in the interpolation processing section 150 may be transmitted to the other control units.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 120, 220, 320 storage section; 125, 225, 325 shared area; 140, 240, 340 analysis processing section; 141, 241, 341 axis exchange analysis section; 150, 250, 350 interpolation processing section; 160, 260, 360 axis exchange processing section; 165, 265, 365 data transfer section; 170, 270, 370 five-axis control calculation section; 180, 280, 380 drive section; 600 processing machine; 700 processing machine; 1000, 2000 numerical control device.

The invention claimed is:
1. A numerical control device comprising:
a first controller to drive a first system axis including a plurality of drive axes based on a first machining program;
a second controller to drive a second system axis including a plurality of drive axes based on a second machining program; and a shared area accessible by the first controller and the second controller, wherein the first controller includes a first axis exchange processing circuitry to write a first control right request for the second system axis to the shared area when executing an axis exchange command contained in the first machining program and designating the second system axis, the second controller includes a second axis exchange processing circuitry to determine, in response to the first control right request being written to the shared area, whether to permit the first control right request in accordance with a drive state of the second system axis, and write a first response indicating a determination result to the shared area, and the first axis exchange processing circuitry determines acquisition of a control right for the second system axis based on the first response written to the shared area.

2. The numerical control device according to claim 1, wherein the second axis exchange processing circuitry writes a second control right request for the first system axis to the shared area when executing an axis exchange command contained in the second machining program and designating the first system axis, the first axis exchange processing circuitry determines, in response to the second control right request being written to the shared area, whether to permit the second control right request in accordance with a drive state of the first system axis, and writes a second response indicating a determination result to the shared area, and the second axis exchange processing circuitry determines acquisition of a control right for the first system axis based on the second response written to the shared area.

3. The numerical control device according to claim 2, wherein the shared area includes a first shared area accessible by the first controller and a second shared area accessible by the second controller.

4. The numerical control device according to claim 3, wherein the first shared area includes a first region and a second region, the second shared area includes a third region and a fourth region, the first controller includes a first data transfer circuitry to periodically transfer data stored in the first region to the fourth region, the second controller includes a second data transfer circuitry to periodically transfer data stored in the third region to the second region, the first axis exchange processing circuitry writes the first control right request to the first region of the first shared area, the second axis exchange processing circuitry acquires the first control right request via the fourth region of the second shared area, and writes the first response to the third region of the second shared area, the first axis exchange processing circuitry determines the acquisition of the control right for the second system axis based on the first response transferred to the second region of the first shared area, the second axis exchange processing circuitry writes the second control right request to the third region of the second shared area, the first axis exchange processing circuitry acquires the second control right request via the second region of the first shared area, and writes the second response to the first region of the first shared area, and the second axis exchange processing circuitry determines the acquisition of the control right for the first system axis based on the second response transferred to the fourth region of the second shared area.

5. The numerical control device according to claim 4, wherein in response to acquiring the control right for the second system axis, the first axis exchange processing circuitry writes, to the first region of the first shared area, a position command for the second system axis described in the first machining program, and in response to acquiring the control right for the first system axis, the second axis exchange processing circuitry writes, to the third region of the second shared area, a position command for the first system axis described in the second machining program.

6. The numerical control device according to claim 4, wherein in response to acquiring the control right for the second system axis, the first axis exchange processing circuitry writes, to the first region of the first shared area, a result of interpolation processing on a position command for the second system axis described in the first machining program, and in response to acquiring the control right for the first system axis, the second axis exchange processing circuitry writes, to the third region of the second shared area, a result of interpolation processing on a position command for the first system axis described in the second machining program.

7. The numerical control device according to claim 4, wherein when permitting the first control right request, the second axis exchange processing circuitry writes a feedback signal acquired from a sensor for the second system axis to the third region of the second shared area, and when permitting the second control right request, the first axis exchange processing circuitry writes a feedback signal acquired from a sensor for the first system axis to the first region of the first shared area.

8. The numerical control device according to claim 4, wherein the first system axis includes a first axis and a second axis, the second system axis includes a third axis and a fourth axis, the first region includes a first entry to store information about the first axis, a second entry to store information about the second axis, a third entry to store information about the third axis, and a fourth entry to store information about the fourth axis, the second region includes a fifth entry to store information about the first axis, a sixth entry to store information about the second axis, a seventh entry to store information about the third axis, and an eighth entry to store information about the fourth axis, and the first axis exchange processing circuitry writes a third control right request to the third entry when executing an axis exchange command contained in the first machining program and designating the third axis, and determines acquisition of a control right for the third axis based on a response from the second controller to the third control right request transferred to the seventh entry.

9. The numerical control device according to claim 8, wherein the third control right request includes identification information indicating that the third control right request is a control right request from the first controller.

10. The numerical control device according to claim 8, wherein
the first axis exchange processing circuitry acquires a fourth control right request for the third axis from the second controller via the seventh entry, and writes a response to the fourth control right request to the third entry.

11. The numerical control device according to claim 10, wherein
the response to the fourth control right request includes information indicating that the fourth control right request is a control right request from the second controller and information indicating whether to permit the fourth control right request.

12. The numerical control device according to claim 2, wherein
the shared area is accessible by the first controller and the second controller, and includes a first region and a second region,
the first axis exchange processing circuitry writes the first control right request to the first region of the shared area,
the second axis exchange processing circuitry acquires the first control right request via the first region of the shared area, and writes the first response to the first region of the shared area,
the first axis exchange processing circuitry determines the acquisition of the control right for the second system axis based on the first response written to the first region,
the second axis exchange processing circuitry writes the second control right request to the second region of the shared area,
the first axis exchange processing circuitry acquires the second control right request via the second region of the shared area, and writes the second response to the second region of the shared area, and
the second axis exchange processing circuitry determines the acquisition of the control right for the first system axis based on the second response written to the second region.

13. The numerical control device according to claim 12, wherein
the shared area is provided outside the first controller and the second controller.

14. The numerical control device according to claim 2, wherein
the second axis exchange processing circuitry permits the first control right request in response to the second system axis being stopped, and
the first axis exchange processing circuitry permits the second control right request in response to the first system axis being stopped.

15. The numerical control device according to claim 2, wherein
the second axis exchange processing circuitry permits the first control right request in response to the second system axis being stopped and a peripheral instrument being deactivated, and
the first axis exchange processing circuitry permits the second control right request in response to the first system axis being stopped and the peripheral instrument being deactivated.

16. The numerical control device according to claim 1, wherein
the first controller is configured to drive a third system axis, and
after the second system axis is replaced with the third system axis, the second controller writes a fifth control right request for the third system axis to the shared area based on an axis exchange command described in the second machining program and designating the third system axis, and determines acquisition of a control right for the third system axis based on a response from the first controller to the fifth control right request written to the shared area.

17. The numerical control device according to claim 1, further comprising
a third controller to drive a third system axis based on a third machining program, wherein
the shared area is accessible by the first controller, the second controller, and the third controller,
the third controller includes
a third axis exchange processing circuitry to write a third control right request for the second system axis to the shared area when executing an axis exchange command contained in the third machining program and designating the second system axis,
the second axis exchange processing circuitry of the second controller determines, in response to the third control right request being written to the shared area, whether to permit the third control right request in accordance with a drive state of the second system axis, and writes a third response indicating a determination result to the shared area,
the third axis exchange processing circuitry determines acquisition of a control right for the second system axis based on the third response written to the shared area,
the second axis exchange processing circuitry writes a fourth control right request for the third system axis to the shared area when executing an axis exchange command contained in the second machining program and designating the third system axis,
the third axis exchange processing circuitry determines, in response to the fourth control right request being written to the shared area, whether to permit the fourth control right request in accordance with a drive state of the third system axis, and writes a fourth response indicating the determination result to the shared area, and
the second axis exchange processing circuitry determines acquisition of a control right for the third system axis based on the fourth response written to the shared area.

18. The numerical control device according to claim 1, wherein
the first controller drives a fourth system axis including a plurality of drive axes based on a fourth machining program, and
the second controller drives a fifth system axis including a plurality of drive axes based on a fifth machining program.

19. The numerical control device according to claim 1, wherein
the first controller and the second controller execute the first machining program and the second machining program in parallel.

20. The numerical control device according to claim 1, wherein
the first controller determines acquisition of a control right for the first system axis based on a drive state of the first system axis when executing an axis exchange command contained in the first machining program and designating the first system axis, and writes, to the shared area, that the control right for the first system axis has been acquired by the first controller based on the determination result.

* * * * *